US012671478B2

(12) United States Patent
Yuan et al.

(10) Patent No.: US 12,671,478 B2
(45) Date of Patent: Jun. 30, 2026

(54) CHANNEL INFORMATION OBTAINING METHOD AND RELATED DEVICE

(71) Applicant: HUAWEI TECHNOLOGIES CO., LTD., Shenzhen (CN)

(72) Inventors: Yiling Yuan, Shanghai (CN); Shibin Ge, Shanghai (CN); Li Fan, Shanghai (CN); Jie Wang, Shanghai (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 403 days.

(21) Appl. No.: 18/352,896

(22) Filed: Jul. 14, 2023

(65) Prior Publication Data

US 2023/0361836 A1 Nov. 9, 2023

Related U.S. Application Data

(63) Continuation of application No. PCT/CN2021/072359, filed on Jan. 17, 2021.

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0456* (2013.01); *H04B 7/0639* (2013.01); *H04L 5/0048* (2013.01)

(58) Field of Classification Search
None
See application file for complete search history.

(56) References Cited

U.S. PATENT DOCUMENTS

| 11,271,621 | B2 * | 3/2022 | Noh | ...................... H04L 5/0037 |
| 2014/0098689 | A1 | 4/2014 | Lee et al. | |
| 2015/0162966 | A1 | 6/2015 | Kim et al. | |
| 2020/0119785 | A1 | 4/2020 | Varatharaajan et al. | |
| 2021/0044340 | A1 * | 2/2021 | Rahman | ................ H04B 7/063 |

FOREIGN PATENT DOCUMENTS

| CN | 111342873 A | 6/2020 |
| CN | 111356171 A | 6/2020 |

(Continued)

OTHER PUBLICATIONS

Vivo, "Further discussion and evaluation on MTRP CSI and partial reciprocity," 3GPP TSG RAN WG1 #103-e, R1-2009509, e-Meeting, Oct. 26-Nov. 13, 2020, 25 pages.

(Continued)

*Primary Examiner* — Luna Weissberger
(74) *Attorney, Agent, or Firm* — Fish & Richardson P.C.

(57) ABSTRACT

This application provides a channel information obtaining method and a related device. In the method, first indication information may be received, where the first indication information indicates one of a plurality of parameter configuration combinations of a reference signal, and the plurality of parameter configuration combinations are associated with a same codebook. A terminal device may feed back channel state information based on the indicated parameter configuration combination.

21 Claims, 5 Drawing Sheets

(56) References Cited

FOREIGN PATENT DOCUMENTS

| WO | 2020164108 A1 | 8/2020 | |
| WO | WO-2021155514 A1 * | 8/2021 | ........... H04B 7/0626 |

OTHER PUBLICATIONS

Office Action in Japanese Appln. No. 2023-542968, mailed on Sep. 3, 2024, 11 pages (with English translation).
Extended European Search Report in European Appln. No. 21918661. 6, mailed on Feb. 26, 2024, 16 pages.
3GPP TS 38.214 V15.11.0, 3rd Generation Partnership Project; Technical Specification Group Radio Access Network; NR; Physical layer procedures for data (Release 15), Sep. 2020, 106 pages.
International Search Report and Written Opinion in International Appln. No. PCT/CN2021/072359, mailed on Oct. 12, 2021, 17 pages (with English translation).

* cited by examiner $$C_{DL}^{p} = \sum_{n=1}^{N_f} H_{eq}^{p,n}$$

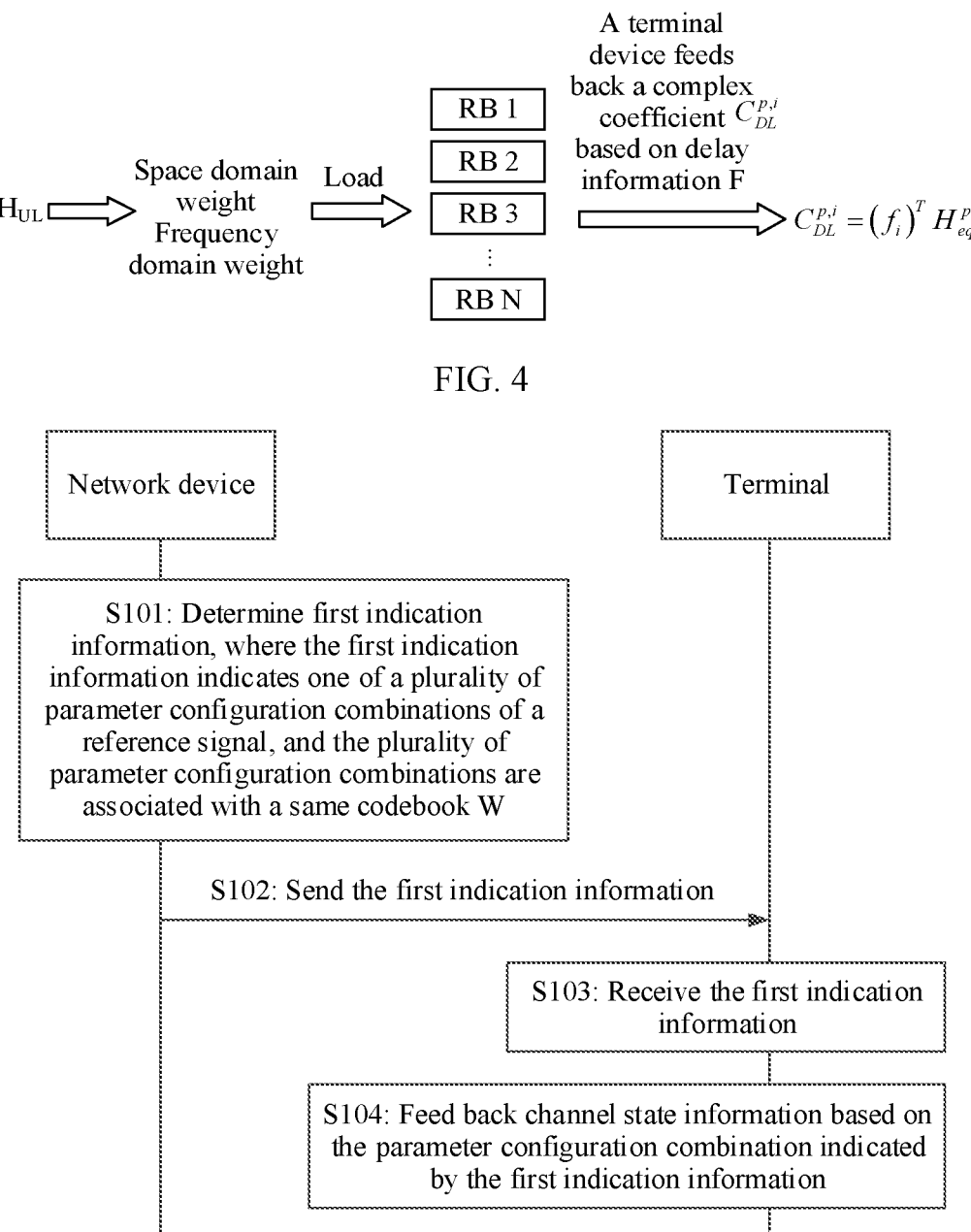

$$H_{UL} \Longrightarrow \begin{matrix} \text{Space domain} \\ \text{weight} \\ \text{Frequency} \\ \text{domain weight} \end{matrix} \quad \text{Load} \Longrightarrow \begin{matrix} \boxed{\text{RB 1}} \\ \boxed{\text{RB 2}} \\ \boxed{\text{RB 3}} \\ \vdots \\ \boxed{\text{RB N}} \end{matrix}$$

A terminal device feeds back a complex coefficient $C_{DL}^{p,i}$ based on delay information F $$\Longrightarrow \quad C_{DL}^{p,i} = (f_i)^T H_{eq}^p$$

FIG. 4

Network device

Terminal

S101: Determine first indication information, where the first indication information indicates one of a plurality of parameter configuration combinations of a reference signal, and the plurality of parameter configuration combinations are associated with a same codebook W S102: Send the first indication information S103: Receive the first indication information S104: Feed back channel state information based on the parameter configuration combination indicated by the first indication information

CHANNEL INFORMATION OBTAINING METHOD AND RELATED DEVICE

CROSS-REFERENCE TO RELATED APPLICATIONS

This application is a continuation of International Application No. PCT/CN2021/072359, filed on Jan. 17, 2021, the disclosure of which is hereby incorporated by reference in its entirety.

TECHNICAL FIELD

This application relates to the field of communication technologies, and in particular, to a channel information obtaining method and a related device.

BACKGROUND

To improve spectral efficiency of a system, a massive multiple-input multiple-output (massive multi-input multi-output, massive MIMO) technology is widely applied. When the massive MIMO technology is used, before sending data to a terminal device, a network device needs to precode the data. How the network device precodes the data is determined mainly based on channel state information (channel state information, CSI) of a downlink channel that is fed back by the terminal device to the network device.

For a time division multiplexing (time division duplexing, TDD) system, because an uplink channel and a downlink channel use a same frequency band, CSI of the downlink channel can be obtained through the uplink channel by using reciprocity of the channel, and then a codebook is determined for precoding. However, for a frequency division multiplexing (frequency division duplexing, FDD) system, because a spacing between uplink and downlink frequency bands is greater than a bandwidth, uplink and downlink channels do not have complete reciprocity, but have partial reciprocity. For example, the network device can obtain reciprocal information, such as an angle and a delay, between the uplink and downlink channels from the uplink channel, and load the reciprocity information onto a channel state information-reference signal (channel state information-reference signal, CSI-RS). The terminal device can feed back, to the network device, information that the uplink and downlink channels are non-reciprocal, for example, complex coefficients $C_{UL}$ and $C_{DL}$ corresponding to uplink and downlink angle-delay pairs. Further, the network device can obtain complete CSI of the downlink channel based on the non-reciprocal information.

The reciprocal information, such as the angle and the delay, is loaded onto a port of a reference signal in different manners, so that a communication system has different overheads, performance, and complexity. However, a current codebook can correspond to channel measurement configuration of only one loading manner. As a result, a current channel information obtaining method cannot meet requirements for overheads, performance, complexity, and the like.

SUMMARY

This application provides a channel information obtaining method and a related device, to facilitate flexible configuration of channel information measurement, so that a corresponding obtaining method meets requirements for overheads, performance, complexity, and the like.

According to a first aspect, this application provides a channel information obtaining method. In the method, first indication information may be received. The first indication information indicates one of a plurality of parameter configuration combinations of a reference signal, and the plurality of parameter configuration combinations are associated with a same codebook. Therefore, a terminal device may feed back channel state information based on the indicated parameter configuration combination. It can be learned that a network device may select one of the plurality of parameter configuration combinations and indicate the indicated parameter configuration combination to the terminal device. This helps implement flexible selection of a channel state information obtaining manner, and meet requirements of a system for overheads, performance, complexity, and the like.

According to a second aspect, this application further provides a channel information obtaining method. The method corresponds to the method in the first aspect and is described from a perspective of a network device side. In the method, the network device may determine and send first indication information. The first indication information indicates one of a plurality of parameter configuration combinations of a reference signal, and the plurality of parameter configuration combinations are associated with a same codebook W. It can be learned that the network device may select one of the plurality of parameter configuration combinations and indicate the indicated parameter configuration combination to a terminal device. This helps implement flexible selection of a channel state information obtaining manner, and meet requirements of a system for overheads, performance, complexity, and the like.

Optional implementations applicable to the first aspect and the second aspect are described below.

In an optional implementation, the parameter configuration combination indicated by the first indication information is associated with an angle and delay information loading manner. The angle and delay information loading manner is a manner in which the network device loads the angle and delay information onto a port of the reference signal when sending the reference signal. Based on this implementation, the network device may flexibly configure, based on characteristics such as overheads, performance, complexity, and the like of different loading manners, a parameter configuration combination required for channel information measurement.

In another optional implementation, the parameter configuration combination indicated by the first indication information is associated with a channel state information (channel state information, CSI) feedback mode. The angle and delay information loading manner on the port of the reference signal is associated with the CSI feedback mode used by the terminal device. Therefore, this implementation helps the terminal device use a corresponding CSI feedback mode based on the indicated parameter configuration combination.

In still another optional implementation, the parameter configuration combination indicated by the first indication information is associated with an angle and delay information loading manner, and the parameter configuration combination indicated by the first indication information is further associated with a CSI feedback mode. In this way, for the network device side, the network device can flexibly select the angle and delay information loading manner. For the terminal device, a corresponding CSI feedback mode that needs to be used can be learned in a timely manner, to help meet requirements of a system for overheads, performance, complexity, and the like.

In an optional implementation, the parameter configuration combination indicated by the first indication information includes a quantity K of frequency domain vectors corresponding to each port of the reference signal, where $K \geq 1$. When K is equal to 1, angle-delay pair information is loaded onto the port of the reference signal. When K is greater than 1, angle information or a part of angle-delay pair information is loaded onto the port of the reference signal. It can be learned that the network device may restrict K, so that various implementations can be performed by using a same codebook, which facilitates flexible configuration of channel information measurement, and meets requirements of a system for performance, overheads, complexity, and the like.

In another optional implementation, the parameter configuration combination indicated by the first indication information includes a quantity M of frequency domain vectors that are allowed to be selected by the first apparatus and that are in K frequency domain vectors corresponding to each port of the reference signal, where $K \geq 1$, and $1 \leq M \leq K$. When M is greater than 1, angle information or a part of angle-delay pair information is loaded onto the port of the reference signal. It can be learned that the network device may restrict M, so that various implementations can be performed by using a same codebook, which facilitates flexible configuration of channel information measurement, and meets requirements of a system for performance, overheads, complexity, and the like.

In a possible implementation, the codebook W meets the following characteristic:

$$W = W_1 \tilde{W}_2 W_f^H, \text{ where}$$

$W_1$ is an angle and delay information selection matrix or a port selection matrix whose dimension is $OP \times L$, and indicates L pieces of angle and delay information or L ports selected by the first apparatus from OP pieces of angle and delay information or OP ports, where $O \geq 1$, $P \geq 1$, and $1 \leq L \leq OP$. O represents an amount of angle-delay pair information or angle information loaded onto each port of the reference signal, or represents a quantity of resource configurations of the reference signal, or represents a quantity of pattern configurations of the reference signal. P represents a quantity of ports corresponding to one pattern configuration and one resource configuration of the reference signal. $\tilde{W}_2$ is a complex coefficient matrix whose dimension is $L \times M$, and $\tilde{W}_2$ includes a maximum of $K_0$ non-zero elements, where $1 \leq K_0 \leq L \times M$. $W_f$ is a frequency domain selection matrix whose dimension is $N_f \times M$, and indicates M frequency domain vectors selected by the first apparatus from the K frequency domain vectors corresponding to each port, where $1 \leq M \leq K \leq N_f$. The parameter configuration combination indicated by the first indication information includes one or more of the following parameters of the codebook W: O, P, L, $N_f$, M, K, and $K_0$.

Optionally, a value of the foregoing parameter of the codebook W may be sent to the terminal device by using one or more pieces of indication information, for example, is separately indicated by using one or more pieces of signaling, or is hierarchically indicated by using a plurality of pieces of signaling.

In an optional implementation, in the codebook, $W_1$ is an identity matrix when $O \times P$ is less than a first value, or P is less than a second value, or O is equal to 1. The first value and the second value may be notified to the terminal device by using a protocol agreement or a manner indicated by the network device.

In this application, the network device configures a value of K or M in $W_f$ in a same codebook, to use different implementations, so that the terminal device uses a CSI obtaining solution such as a different CSI feedback manner. Alternatively, the network device may configure K or M in $W_f$ to restrict configuration of another parameter.

In an optional implementation, when K is equal to 1, $O \geq 2$. Alternatively, when K is equal to 1, $O=1$, and a density of the reference signal is less than 1. When K is greater than 1 or M is greater than 1, O is equal to 1. It can be learned that when K is equal to 1, in addition to a corresponding implementation, the network device and the terminal device may further reduce reference signal overheads by loading a plurality of pieces of angle-delay pair information to the port of the reference signal, or configuring a plurality of resources or a plurality of patterns, or configuring the density of the reference signal to be less than 1.

In another optional implementation, when O is greater than 1, the angle-delay pair information is loaded onto the port of the reference signal, and both M and K are equal to 1. It can be learned that, in this implementation, a value of the parameter O in $W_1$ may be restricted, so that the network device may use different implementations for a same codebook to meet requirements of each implementation for performance and reference signal overheads, and reduce complexity on the terminal side by using a constraint relationship between parameters.

In a possible implementation, the codebook W meets the following characteristic:

$$W = W_1 \tilde{W}_2 W_f^H, \text{ where}$$

$W_1$ is a port selection matrix whose dimension is $P \times L$, and indicates L ports selected by the first apparatus from P ports, where $P \geq 1$, and $1 \leq L \leq P$. P represents a quantity of ports corresponding to one pattern configuration and one resource configuration of the reference signal. $\tilde{W}_2$ is a complex coefficient matrix whose dimension is $L \times M$, and $\tilde{W}_2$ includes a maximum of $K_0$ non-zero elements, where $1 \leq K_0 \leq L \times M$. $W_f$ is a frequency domain selection matrix whose dimension is $N_f \times M$, and indicates M frequency domain vectors selected by the first apparatus from the K frequency domain vectors corresponding to each port, where $1 \leq M \leq K \leq N_f$. The parameter configuration combination indicated by the first indication information includes one or more of the following parameters of the codebook W: P, L, $N_f$, M, K, and $K_0$. It can be learned that in this application, K or M in $W_f$ may be restricted, so that various implementations can be performed by using a same codebook. Further, flexible configuration of channel information measurement is facilitated, to meet requirements of a system for performance, overheads, complexity, and the like.

In an optional implementation, $W_1$ is an identity matrix when P is less than a third value.

In this application, the network device configures a value of K or M in $W_f$ in a same codebook, to use different implementations, so that the terminal device uses a CSI obtaining solution such as a different CSI feedback manner. Alternatively, the network device may configure K or M in $W_f$ to restrict configuration of another parameter. In this implementation, optionally, when K is equal to 1, a density of the reference signal is less than 1.

In this application, optionally, each port of the reference signal corresponds to K same frequency domain vectors in each resource configuration and each pattern configuration; or different resource configurations of the reference signal correspond to K different frequency domain vectors; or different pattern configurations of the reference signal correspond to K different frequency domain vectors, or different ports of the reference signal are corresponding to K different frequency domain vectors.

In an optional implementation, the parameter configuration combination indicated by the first indication information further includes a length K of a window, or further includes a start point of a window and a length K or 2K of the window. The window is an index range of optional frequency domain vectors that include the K frequency domain vectors corresponding to each port of the reference signal.

According to a third aspect, this application provides a communication apparatus. The communication apparatus has a function of implementing the method example according to the first aspect or the optional implementations of the first aspect. For example, the communication apparatus may have a function for implementing some or all embodiments of this application, or may have a function for independently implementing any embodiment in this application. The function may be implemented by hardware, or may be implemented by hardware executing corresponding software. The hardware or the software includes one or more units or modules corresponding to the functions.

In an implementation, a structure of the communication apparatus may include a processing unit and a communication unit. The processing unit is configured to support the communication apparatus in performing a corresponding function in the foregoing method. The communication unit is configured to support communication between the communication apparatus and another device. The communication apparatus may further include a storage unit. The storage unit is configured to be coupled to the processing unit and a sending unit, and the storage unit stores a computer program and data that are necessary for the communication apparatus.

In an implementation, the communication apparatus includes:

the communication unit, configured to receive first indication information, where the first indication information indicates one of a plurality of parameter configuration combinations of a reference signal, and the plurality of parameter configuration combinations are associated with a same codebook W, where the communication unit is further configured to feed back channel state information based on the parameter configuration combination indicated by the first indication information.

Optionally, the communication apparatus may further include the processing unit, configured to determine the channel state information based on the parameter configuration combination indicated by the first indication information.

For example, the processing unit may be a processor, the communication unit may be a transceiver unit, a transceiver, or a communication interface, and the storage unit may be a memory. It may be understood that the communication unit may be a transceiver in the communication apparatus, for example, implemented by using an antenna, a feeder, a codec, or the like in the communication apparatus. Alternatively, if the communication apparatus is a chip disposed in a terminal device, the communication unit may be an input/output interface of the chip, for example, an input/output circuit or a pin.

According to a fourth aspect, this application further provides another communication apparatus. The communication apparatus has a function of implementing the method example according to the second aspect. For example, the communication apparatus may have a function for implementing some or all embodiments of this application, or may have a function for independently implementing any embodiment in this application. The function may be implemented by hardware, or may be implemented by hardware executing corresponding software. The hardware or the software includes one or more units or modules corresponding to the functions.

In an implementation, a structure of the communication apparatus may include a processing unit and a communication unit. The processing unit is configured to support the communication apparatus in performing a corresponding function in the method according to the second aspect. The communication unit is configured to support communication between the communication apparatus and another device. The communication apparatus may further include a storage unit. The storage unit is configured to be coupled to the processing unit and a sending unit, and the storage unit stores a computer program and data that are necessary for the communication apparatus.

In an implementation, the communication apparatus includes:

the processing unit, configured to determine first indication information, where the first indication information indicates one of a plurality of parameter configuration combinations of a reference signal, and the plurality of parameter configuration combinations are associated with a same codebook W; and the communication unit, configured to send the first indication information.

For example, the processing unit may be a processor, the communication unit may be a transceiver unit, a transceiver, or a communication interface, and the storage unit may be a memory. It may be understood that the communication unit may be a transceiver in the apparatus, for example, implemented by using an antenna, a feeder, a codec, or the like in the apparatus. Alternatively, if the communication apparatus is a chip disposed in a network device, the communication unit may be an input/output interface of the chip, for example, an input/output circuit or a pin.

According to a fifth aspect, an embodiment of the present invention provides a computer-readable storage medium, configured to store a computer program. When the computer program is run on a communication apparatus, the communication apparatus performs the channel information obtaining method according to the first aspect.

According to a sixth aspect, an embodiment of the present invention provides a computer-readable storage medium, configured to store a computer program. When the computer program is run on a communication apparatus, the communication apparatus performs the channel information obtaining method according to the second aspect.

According to a seventh aspect, this application further provides a computer program product including a computer program. When the computer program product is run on a communication apparatus, the communication apparatus is enabled to perform the channel information obtaining method according to the first aspect.

According to an eighth aspect, this application further provides a computer program product including a computer program. When the computer program product is run on a communication apparatus, the communication apparatus is enabled to perform the channel information obtaining method according to the second aspect.

According to a ninth aspect, this application provides a chip system. The chip system includes at least one processor and an interface, configured to support a terminal device in implementing a function in the first aspect, for example, determining or processing at least one of data or information in the foregoing method. In a possible design, the chip system further includes a memory, and the memory is configured to store a computer program and data that are necessary for the terminal device. The chip system may include a chip, or may include a chip and another discrete component.

According to a tenth aspect, this application provides a chip system. The chip system includes a processor and an interface, configured to support a network device in implementing a function in the second aspect, for example, determining or processing at least one of data and information in the foregoing method. In a possible design, the chip system further includes a memory, and the memory is configured to store a computer program and data that are necessary for the network device. The chip system may include a chip, or may include a chip and another discrete component.

BRIEF DESCRIPTION OF DRAWINGS

FIG. 4 is a schematic diagram of another channel state information obtaining solution;

FIG. 5 is a schematic flowchart of a channel information obtaining method according to an embodiment of this application;

DESCRIPTION OF EMBODIMENTS

Figure 1:
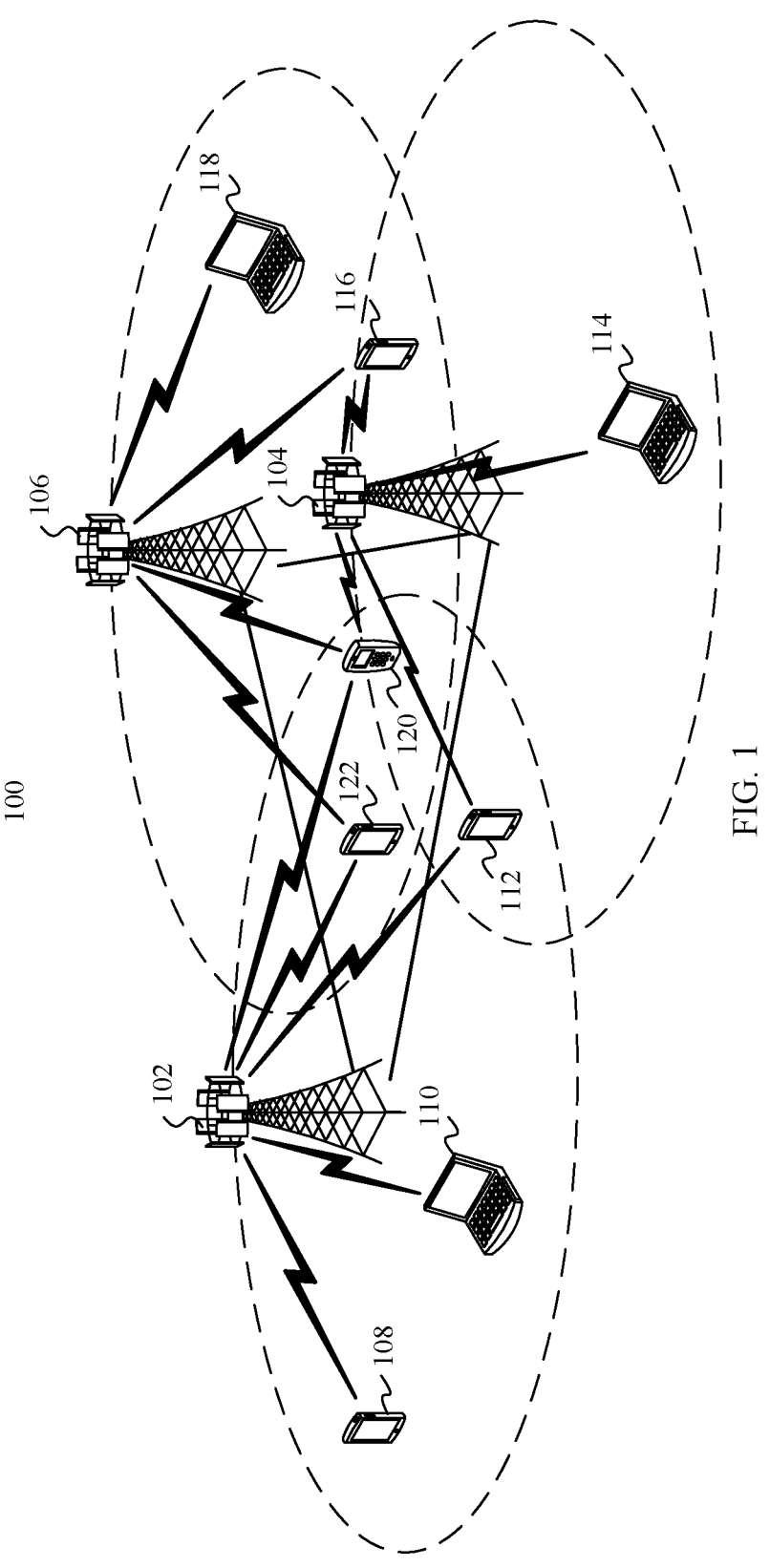
FIG. 1 is a schematic diagram of a communication system.

FIG. 1 is a schematic diagram of a wireless communication network 100 applicable to an embodiment of this application. As shown in FIG. 1, the wireless communication network 100 includes base stations 102, 104, and 106 and terminal devices 108, 110, 112, 114, 116, 118, 120, and 122. The base stations 102, 104, and 106 may communicate with each other by using backhaul (backhaul) links (as shown by straight lines between the base stations 102, 104, and 106). The backhaul link may be a wired backhaul link (for example, an optical fiber or a copper cable) or a wireless backhaul link (for example, a microwave). The terminal devices 108, 110, 112, 114, 116, 118, 120, and 122 may communicate with the corresponding base stations 102, 104, and 106 by using wireless links (for example, as shown by fold lines between the base stations 102, 104, and 106 and the terminal devices 108, 110, 112, 114, 116, 118, 120, and 122).

The base stations 102, 104, and 106 usually provide, as access devices, a wireless access service for the terminal devices 108, 110, 112, 114, 116, 118, 120, and 122 that generally serve as user equipment. Specifically, each base station corresponds to one service coverage area (which may also be referred to as a cellular, as shown in each elliptical area in FIG. 1), and a terminal device entering the area may communicate with the base station by using a wireless signal, to receive a wireless access service provided by the base station. A terminal device in an overlapping area may receive wireless signals from a plurality of base stations. Therefore, these base stations may coordinate with each other, to provide a service for the terminal device. For example, the plurality of base stations may provide services for the terminal device in the overlapping area by using a coordinated multipoint transmission/reception (Coordinated Multipoint Transmission/Reception, CoMP) technology. For example, as shown in FIG. 1, a service coverage area of the base station 102 overlaps a service coverage area of the base station 104, and the terminal device 112 falls into an overlapping area. Therefore, the terminal device 112 may receive wireless signals from the base station 102 and the base station 104. The base station 102 and the base station 104 may coordinate with each other, to provide a service for the terminal device 112. For another example, as shown in FIG. 1, a common overlapping area exists in service coverage areas of the base stations 102, 104, and 106, and the terminal device 120 falls into the overlapping area. Therefore, the terminal device 120 may receive wireless signals from the base stations 102, 104, and 106. The base stations 102, 104, and 106 may coordinate with each other, to provide a service for the terminal device 120.

Depending on a used wireless communication technology, the base station may also be referred to as a NodeB (NodeB), an evolved NodeB (evolved NodeB, eNodeB), an access point (Access Point, AP), or the like. In addition, based on an area of a provided service coverage area, base stations may be further divided into a macro base station configured to provide a macro cell (Macro cell), a micro base station configured to provide a micro cell (Micro cell), a pico base station configured to provide a pico cell (Pico cell), a femto base station configured to provide a femto cell (Femto cell), and the like. As wireless communication technologies keep evolving, another name may be used for a future base station.

A base station generally includes a plurality of components, for example, but not limited to, a baseband part, a radio frequency part, and an antenna array part.

The baseband part is configured to perform a plurality of baseband processing operations, for example, but not limited to, encoding and decoding, modulation and demodulation, precoding, time-frequency conversion, and the like. In a specific implementation process, the baseband part is usually implemented by, for example, but not limited to, a baseband unit (BaseBand Unit, BBU).

The radio frequency part is configured to perform a plurality of radio frequency processing operations, for example, but not limited to, intermediate frequency processing and filtering. In a specific implementation process, the radio frequency part is usually implemented by, for example, but not limited to, a radio frequency unit (Radio Frequency Unit, RFU).

Antenna arrays can be divided into an active antenna array and a passive antenna array, and are responsible for transmitting and receiving signals.

Product forms of the base station are rich. For example, in a product implementation process, the BBU and the RFU may be integrated in a same device, and the device is connected to the antenna array by using a cable (for example, but not limited to a feeder). Alternatively, the BBU and the RFU may be separately disposed, and the BBU and the RFU are connected by using an optical fiber, and communicate with each other by using, for example, but not limited to, a common public radio interface (Common Public Radio Interface, CPRI) protocol. In this case, the RFU is generally referred to as an RRU (Remote Radio Unit, remote radio unit), and is connected to the antenna array by using a cable. In addition, the RRU may further be integrated with the antenna array. For example, an active antenna unit (Active Antenna Unit, AAU) product in the market currently uses this structure.

In addition, the BBU may be further decomposed into a plurality of parts. For example, the BBU may be further subdivided into a central unit (Central Unit, CU) and a distributed unit (Distributed Unit, DU) based on real-time performance of a processed service. The CU processes non-real-time protocols and services, and the DU processes physical-layer protocols and real-time services. Further, some physical layer functions may be further separated from the BBU or the DU and integrated into the AAU.

It can be learned from the foregoing description that a base station may include a plurality of parts, and has a plurality of different product forms. In this case, technical solutions described in embodiments of this application may relate to only one or more parts of the base station, or may relate to the entire base station. Therefore, the base station in embodiments of this application may be a base station product that includes only several parts used to implement the technical solutions in embodiments of this application, or may be an entire base station. The foregoing several parts may include, for example, but not limited to, one or more of the foregoing baseband part, the radio frequency part, the antenna array, the BBU, the RRU, the RFU, the AAU, the CU, and the DU. Further, the technical solutions provided in embodiments of this application may be implemented by only a corresponding chip in each of the foregoing several parts. In each part, the technical solutions provided in embodiments of this application may involve one chip, or may involve a plurality of chips. It can be learned that the technical solutions provided in embodiments of this application may be implemented by the entire base station, or may be implemented by several parts of the base station, or may be implemented by one or more chips in these parts, that is, implemented by one or more chips in the base station. For example, a technical solution may be implemented only by a part that is of a base station and that is related to baseband processing. Further, the technical solution may be implemented by a BBU, or implemented by a CU, or implemented by a DU, or jointly implemented by a CU and a DU, or implemented by an AAU, or implemented by one or more chips of these devices.

Functions and product forms of the base station are clearly described in the conventional technology, and details are not described in this specification.

The terminal devices 108, 110, 112, 114, 116, 118, 120, and 122 may be various wireless communication devices having a wireless communication function, for example, but not limited to, a mobile cellular phone, a cordless phone, a personal digital assistant (Personal Digital Assistant, PDA), a smartphone, a notebook computer, a tablet computer, a wireless data card, a wireless modem (Modulator demodulator, Modem), or a wearable device such as a smart watch. With the rise of internet of things (internet of things, IOT) technologies and vehicle-to-everything (vehicle-to-everything, V2X) technologies, a growing quantity of devices that previously have no communication function, for example but not limited to, a household appliance, a vehicle, a tool device, a service device, and a service facility, begin to obtain a wireless communication function by configuring a wireless communication unit, to access a wireless communication network and accept remote control. Such a device has a wireless communication function because the device is configured with a wireless communication unit, and therefore also belongs to a scope of wireless communication devices. In addition, the terminal devices 108, 110, 112, 114, 116, 118, 120, and 122 may also be referred to as mobile stations, mobile devices, mobile terminals, wireless terminals, handheld devices, clients, or the like.

The base stations 102, 104, and 106 and the terminal devices 108, 110, 112, 114, 116, 118, 120, and 122 may be equipped with a plurality of antennas, to support a MIMO (multiple-input multiple-output, Multiple-Input Multiple-Output) technology. Further, the base stations 102, 104, and 106 and the terminal devices 108, 110, 112, 114, 116, 118, 120, and 122 may support not only a single user MIMO (Single-User MIMO, SU-MIMO) technology but also a multi-user MIMO (Multi-User MIMO, MU-MIMO) technology. The MU-MIMO technology may be implemented based on a space division multiple access (Space Division Multiple Access, SDMA) technology. Because a plurality of antennas are configured, the base stations 102, 104, and 106 and the terminal devices 108, 110, 112, 114, 116, 118, 120, and 122 may further flexibly support a single-input single-output (Single-Input Single-Output, SISO) technology, a single-input multiple-output (Single-Input Multiple-Output, SIMO) technology, and a multiple-input single-output (Multiple-Input Single-Output, MISO) technology, to implement various diversity (for example, but not limited to, transmit diversity and receive diversity) and multiplexing technologies. The diversity technology may include, for example, but not limited to, a transmit diversity (Transmit Diversity, TD) technology and a receive diversity (Receive Diversity, RD) technology. The multiplexing technology may be a spatial multiplexing (Spatial Multiplexing) technology. In addition, the foregoing technologies may further include a plurality of implementation solutions. For example, the transmit diversity technology may include Transmit Diversity.

An important use of the MIMO technology is transmit diversity (Transmit Diversity, TD). Transmit diversity improves transmission reliability by performing redundant transmission on an original signal (for example, a symbol) in time, frequency, space (for example, an antenna), or various combinations of the foregoing three dimensions. In a specific implementation process, a quantity of redundant transmissions may be set based on a channel model or channel quality, and an object of redundant transmission may be the original signal, or may be a signal obtained after the original signal is processed. Such processing may include, for example, but not limited to, delay, inversion, conjugate, and rotation, and processing obtained after derivation, evolution, and combination of the foregoing various processing.

Currently, commonly used transmit diversity includes diversity manners, for example, but not limited to, space-time transmit diversity (Space-Time Transmit Diversity, STTD), space-frequency transmit diversity (Space-Frequency Transmit Diversity, SFTD), time switched transmit diversity (Time Switched Transmit Diversity, TSTD), frequency switched transmit diversity (Frequency Switch Transmit Diversity, FSTD), orthogonal transmit diversity (Orthogonal Transmit Diversity, OTD), and cyclic delay diversity (Cyclic Delay Diversity, CDD), and diversity manners obtained after the foregoing diversity manners are derived, evolved, and combined. For example, currently, transmit diversity manners such as space time block coding (Space Time Block Coding, STBC), space frequency block coding (Space Frequency Block Coding, SFBC), and CDD are used in a long term evolution (Long Term Evolution, LTE) standard.

The foregoing summarily describes transmit diversity by using examples. A person skilled in the art should understand that, in addition to the foregoing examples, transmit diversity further includes a plurality of other implementations. Therefore, the foregoing descriptions shall not be understood as a limitation on the technical solutions of this application, and the technical solutions of this application shall be understood as being applicable to various possible transmit diversity solutions.

In addition, the base stations 102, 104, and 106 and the terminal devices 108, 110, 112, 114, 116, 118, 120, and 122 may communicate with each other by using various wireless communication technologies.

With development of communication theories and practice, more wireless communication technologies appear and gradually become mature. The wireless communication technologies include but are not limited to a time division multiple access (Time Division Multiple Access, TDMA) technology, a frequency division multiple access (Frequency Division Multiple Access, FDMA) technology, a code division multiple access (Code Division Multiple Access, CDMA) technology, a time division-synchronous code division multiple access (Time Division-Synchronous Code Division Multiple Access, TD-SCDMA) technology, an orthogonal frequency division multiple access (Orthogonal FDMA, OFDMA) technology, a single carrier frequency division multiple access (Single Carrier FDMA, SC-FDMA) technology, a space division multiple access (Space Division Multiple Access, SDMA) technology, technologies evolved and derived from the technologies, and the like. As a radio access technology (Radio Access Technology, RAT), the foregoing wireless communication technologies are adopted in various wireless communication standards, so that various wireless communication systems (or networks) that are well known today are constructed. These wireless communication systems include, but are not limited to, a global system for mobile communications (Global System for Mobile Communications, GSM), CDMA 2000, wideband CDMA (Wideband CDMA, WCDMA), Wi-Fi defined in a 802.11 series standard, worldwide interoperability for microwave access (Worldwide Interoperability for Microwave Access, WiMAX), long term evolution (Long Term Evolution, LTE), LTE-Advanced (LTE-Advanced, LTE-A), 5G, and evolved systems of these wireless communication systems. Unless otherwise stated, the technical solutions provided in embodiments of this application may be applied to the foregoing wireless communication technologies and wireless communication systems. In addition, the terms "system" and "network" may be interchanged.

It should be noted that the wireless communication network 100 shown in FIG. 1 is only an example, and is not intended to limit the technical solutions of this application. A person skilled in the art should understand that in a specific implementation process, the wireless communication network 100 may further include another device, and a quantity of base stations and a quantity of terminal devices may be further configured based on a specific requirement.

To better understand embodiments of this application, the following several descriptions are made before embodiments of this application are described.

First, for ease of description, when a number is involved, consecutive numbers may start from 1. For example, $N_f$ frequency domain units may include a first frequency domain unit to an $N_f^{th}$ frequency domain unit. Certainly, a specific implementation is not limited thereto. For example, consecutive numbers may alternatively start from 0. For example, $N_f$ frequency domain units may include a $0^{th}$ frequency domain unit to an $(N_f-1)^{th}$ frequency domain unit. For brevity, examples are not listed one by one herein. In addition, a corresponding index may be numbered starting from 1 or numbered starting from 0. For example, an index of the first frequency domain unit is 1, and an index of the $N_f^{th}$ frequency domain unit is $N_f$. Alternatively, an index of the 0th frequency domain unit is 0, and an index of the $(N_f-1)^{th}$ frequency domain unit is $N_f-1$.

It should be understood that the foregoing descriptions are all provided to help describe the technical solutions provided in embodiments of this application, but are not intended to limit the scope of this application.

Second, in this application, transformation of a matrix and a vector and operation of a function are involved in a plurality of parts. For ease of understanding, a unified description is provided herein. Matrices A, N, and the like shown in this section are examples.

For a matrix A, a superscript T represents transposition, for example, $A^T$ represents transposition of the matrix (or vector) A. A superscript H represents conjugate transposition, for example, $A^H$ represents conjugate transposition of a matrix (or vector) A.

Third, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Information indicated by indication information is referred to as to-be-indicated information. In a specific implementation process, there are a plurality of manners of indicating the to-be-indicated information, for example, but not limited to, the following manners: The to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may further be identified and indicated in a unified manner, to reduce indication overheads caused by separately indicating same information. For example, a person skilled in the art should understand that a precoding matrix includes precoding vectors, and the precoding vectors in the precoding matrix may have a same part in terms of composition or another attribute.

Furthermore, specific indication manners may alternatively be various existing indication manners, for example, but not limited to, the foregoing indication manners and various combinations thereof. For details of the various indication manners, refer to the conventional technology. Details are not described in this specification. It can be learned from the foregoing descriptions that, for example, when a plurality of pieces of information of a same type need to be indicated, different information may be indicated in different manners. In a specific implementation process, a required indication manner may be selected based on a specific requirement. The selected indication manner is not limited in embodiments of this application. In this way, the indication manner in embodiments of this application should be understood as covering various methods that can enable a to-be-indicated party to learn of the to-be-indicated information.

The to-be-indicated information may be sent as a whole, or may be divided into a plurality of pieces of sub-information for separate sending. In addition, sending periodicities and/or sending occasions of these pieces of sub-information may be the same or may be different. A specific sending method is not limited in this application. The sending periodicities and/or the sending occasions of these pieces of sub-information may be predefined, for example, predefined according to a protocol, or may be configured by a transmit end device by sending configuration information to a receive end device. By way of example but not limitation, the configuration information may include one or a combination of at least two of radio resource control signaling, medium access control (medium access control, MAC) layer signaling, and physical layer signaling. The radio resource control signaling includes, for example, radio resource control (radio resource control, RRC) signaling. The MAC layer signaling includes, for example, a MAC control element (control element, CE). The physical layer signaling includes, for example, downlink control information (downlink control information, DCI).

Fourth, definitions listed in this application for many characteristics (for example, a precoding matrix indicator (precoding matrix indicator, PMI), a channel, a resource block (resource block, RB), a resource block group (resource block group, RBG), a subband, a precoding resource block group (precoding resource block group, PRG), a resource element (resource element, RE), and the like) are merely used to explain functions of the characteristics by way of example.

Fifth, the terms "first", "second", and various numbers in the following embodiments are merely used for differentiation for ease of description, and are not intended to limit the scope of embodiments of this application. For example, the terms are used to differentiate between different indication information.

Sixth, "predefinition" or "preconfiguration" may be implemented by pre-storing corresponding code or a corresponding table in a device (for example, including a terminal device or a network device) or in another manner that can be used to indicate related information. A specific implementation of "predefinition" or "preconfiguration" is not limited in this application. "Storing" may mean storing in one or more memories. The one or more memories may be separately disposed, or may be integrated into an encoder or a decoder, a processor, or a communication apparatus. Alternatively, some of the one or more memories may be separately disposed, and some of the one or more memories are integrated into a decoder, a processor, or a communication apparatus. A type of the memory may be a storage medium in any form. This is not limited in this application.

Seventh, "protocols" in embodiments of this application may be standard protocols in the communication field, for example, may include an LTE protocol, a new radio (new radio, NR) protocol, and a related protocol used for a future communication system. This is not limited in this application.

Eighth, "at least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "/" usually indicates an "or" relationship between the associated objects. "At least one of the following items (pieces)" or a similar expression thereof means any combination of these items, including any combination of singular items (pieces) or plural items (pieces). For example, at least one of a, b, and c may represent: a, b, c, a and b, a and c, b and c, or a, b, and c, where a, b, and c each may be singular or plural.

Ninth, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation; and do not mean any other limitation.

To help understand embodiments of this application, the following briefly describes terms in embodiments of this application.

1. Precoding Technology

A sending device and a plurality of receiving devices can implement transmission on a same time-frequency resource by using a precoding technology, that is, multi-user multiple-input multiple-output (multi-user multiple-input multiple-output, MU-MIMO) is implemented. It should be understood that related descriptions of the precoding technology in this specification are merely examples for ease of understanding, and are not intended to limit the protection scope of embodiments of this application. In a specific implementation process, a network device mainly determines a downlink channel based on channel state information (channel state information, CSI) fed back by a terminal device to the network device. In addition, precoding may also be performed in another manner. For example, when channel state information (for example, but not limited to, a channel matrix) cannot be obtained, precoding is performed by using a preset precoding matrix or performed in a weighted processing manner. For brevity, specific content thereof is not described in this specification.

2. Delay Information, Angle Information, and Angle and Delay Information

When a signal is transmitted through a wireless channel, the signal may arrive at a receive antenna through a plurality of paths from a transmit antenna. A multipath delay causes frequency selective fading, namely, a change in a frequency domain channel.

The delay information is transmission time of a wireless signal on different transmission paths, is determined by a distance and a speed, and is irrelevant to frequency domain of the wireless signal. When a signal is transmitted on different transmission paths, there are different transmission delays due to different distances. Because physical locations of a network device and a terminal device are fixed, multipath distribution of uplink and downlink channels is the same in terms of the delay. Therefore, the delay information on the uplink and downlink channels in an FDD mode may be considered to be the same, in other words, reciprocal.

The angle information may be an angle of arrival (angle of arrival, AOA) at which a signal arrives at a receive antenna through a wireless channel, or may be an angle of departure (angle of departure, AOD) at which a signal is transmitted through a transmit antenna. In embodiments of this application, the angle information may be an angle of arrival at which an uplink signal arrives at the network device, or may be an angle of departure at which the network device transmits a downlink signal. Due to reciprocity of transmission paths of the uplink and downlink channels on different frequencies, an angle of arrival of an uplink reference signal and an angle of departure of a downlink reference signal may be considered to be reciprocal.

The angle information described in this specification is actually an angle vector whose dimension is $N^{tx}*1$, and is denoted as S), where $N^{tx}$ is a quantity of antennas of the network device. Correspondingly, the delay information is actually a delay vector whose dimension is $N_7*1$, and is denoted as F ($\tau_1$). In this specification, $N_f$ represents a quantity of frequency domain units, that is, represents a quantity of frequency domain units included in a transmission bandwidth of the reference signal. Correspondingly, the angle and delay information is actually a combination of an angle vector and a delay vector, and at least one of an angle vector and a delay vector included in any two pieces of angle and delay information is different, that is, each piece of angle and delay information may be uniquely determined by using one angle vector and one delay vector.

3. Reference Signal (Reference Signal, RS)

The reference signal may also be referred to as a pilot (pilot), a reference sequence, or the like. In embodiments of this application, the reference signal may be a reference signal used for channel measurement. For example, the reference signal may be a channel state information reference signal (channel state information reference signal, CSI-RS) used for downlink channel measurement. It should be understood that the foregoing listed reference signals are merely examples, and should not constitute any limitation on this application. This application does not exclude a possibility of defining another reference signal in a future protocol to implement a same or similar function. A reference signal used to obtain channel state information of a downlink channel may also be referred to as a downlink reference signal or a CSI-RS.

A network device may precode the reference signal, and then send the reference signal to a terminal device. The precoding may specifically include beamforming (beamforming) and/or phase rotation. The beamforming may be implemented, for example, by precoding the reference signal based on one or more angle vectors, and the phase rotation may be implemented, for example, by precoding the reference signal based on one or more delay vectors.

The network device performs precoding processing on the reference signal in different manners, and the terminal device also feeds back channel state information in different manners.

4. Port (Port) of Reference Signal

A port of a reference signal is an antenna port used to transmit the reference signal, and a network device may configure a quantity P of ports of the reference signal. In this specification, angle information and/or delay information may be loaded onto each port of the reference signal, that is, each port may be a port obtained after beamforming and/or phase rotation. For example, the reference signal of each port may be obtained by precoding the reference signal based on an angle vector and/or a delay vector.

The reference signal of each port may be transmitted in one or more frequency domain units. In this specification, it is assumed that a transmission bandwidth of the reference signal is $N_f$ frequency domain units. The $N_f$ frequency domain units may be frequency domain units with consecutive or inconsecutive frequencies. Correspondingly, indexes of frequency domain units are described in this application based on a sequence obtained after the $N_f$ frequency domain units are arranged based on a frequency value or the like, instead of an index in system bandwidth. Optionally, when the indexes of the frequency domain units are described in this application, indexes of the $N_f$ frequency domain units in the system bandwidth may also be used for description. However, the indexes are essentially the same. For ease of understanding and description, this is not described in this application again.

5. Frequency Domain Unit

A frequency domain unit may also be referred to as a frequency unit, represents a unit of a frequency domain resource, and may represent different frequency domain resource granularities. The frequency domain unit may include, for example, but is not limited to, one or more subbands (subband, SB), one or more resource blocks (RB), one or more resource block groups (resource block group, RBG), one or more precoding resource block groups (precoding resource block group, PRG), or the like. In the following embodiments, all related descriptions related to the frequency domain unit are described by using a resource block. It should be understood that the RB is merely an example of a frequency domain unit, and should not constitute any limitation on this application. A specific definition of the frequency domain unit is not limited in this application.

As described above, precoding the reference signal based on one or more angle vectors may also be referred to as loading the one or more angle vectors onto the reference signal, to implement beamforming. Precoding the reference signal based on one or more delay vectors may also be referred to as loading the one or more delay vectors onto the reference signal, to implement phase rotation. Precoding the reference signal based on one or more pieces of angle and delay information may also be referred to as loading the one or more pieces of angle and delay information onto the reference signal, to implement beamforming and phase rotation.

To construct complete channel state information (channel state information, CSI) of a downlink channel, a reference signal may be precoded by using information that uplink and downlink channels are reciprocal, and a terminal device may report information that uplink and downlink channels are non-reciprocal. Then a network device constructs the complete CSI based on the reciprocal information and the non-reciprocal information. The reciprocal information may include space domain information and frequency domain information, and the non-reciprocal information may include a complex coefficient corresponding to each piece of angle and delay information.

For example, an uplink channel $H_{UL}$ may be represented as:

$$H_{UL} = SC_{UL}F^H \qquad (1)$$

S is a space domain information matrix whose dimension is $N^{rx} \times N^{rx}$, and physically corresponds to an angle of arrival/an angle of departure of the network device. F is a frequency domain information matrix whose dimension is $N_f \times N_f$, and physically corresponds to a delay of each multipath signal arriving at the network device. $C_{UL}$ is a complex coefficient matrix with a dimension of $N^{rx} \times N_f$, and indicates a complex coefficient corresponding to each piece of angle and delay information of the uplink channel (which may also be referred to as a complex coefficient).

Formula (2) is expressed by using vectorization, and may be converted into:

$$vec(H_{UL}) = (F^* \otimes S)vec(C_{UL}) = Zvec(C_{UL}) \qquad (2)$$

$\otimes$ represents a Kronecker product, and $vec(C_{UL})$ is a column vector formed by complex coefficients corresponding to each piece of angle and delay information of the uplink channel. Therefore, the network device may obtain, according to Formula (1) and Formula (2), a matrix $Z^H$ including weights corresponding to each piece of angle and delay information. $Z^H$ is a complex matrix whose dimension is $N_f N^{rx} \times N_f N^{rx}$, and each column of $Z^H$ is a weight corresponding to each piece of angle and delay information.

The channel state information CSI obtaining solution based on the angle and delay information may include: The network device may load, to a frequency domain unit of each port of the reference signal, a space domain weight and/or a frequency domain weight corresponding to the angle and delay information, to obtain and send the precoded reference signal. Then, the terminal device performs channel estimation based on the reference signal to obtain an equivalent channel of each frequency domain unit on each port, which is denoted as $$H_{eq}^{p,n},$$

where p represents a $p^{th}$ port, and n represents an $n^{th}$ frequency domain unit. The terminal device accumulates equivalent channels on $N_f$ frequency domain units of each port, to obtain and report a complex coefficient of one piece of angle and delay information loaded onto each port. In this way, the network device may construct complete channel state information based on a weight vector of each piece of angle and delay information and a complex coefficient matrix $C_{DL}$ of the downlink channel. The complex coefficient matrix $C_{DL}$ may be determined based on a complex coefficient $$C_{DL}^p$$

of each port.

In this embodiment of this application, the channel state information CSI obtaining solution based on the angle and delay information is related to an angle and delay information loading manner on the network device side and a CSI feedback mode on the terminal device side. Optionally, the channel state information CSI obtaining solution based on the angle and delay information may include but is not limited to the following several CSI obtaining solutions:

In a CSI obtaining solution 1, an angle and delay information loading manner 1.1 is as follows: Angle-delay pair information is loaded onto a port of the reference signal, and the angle-delay pair information includes one piece of angle information and one piece of delay information. In a CSI feedback mode 1.1, the terminal device performs full-band accumulation on equivalent channels on $N_f$ frequency domain units of each port, to obtain and report a complex coefficient of one piece of angle-delay pair information loaded onto each port.

Figures 2, 3:
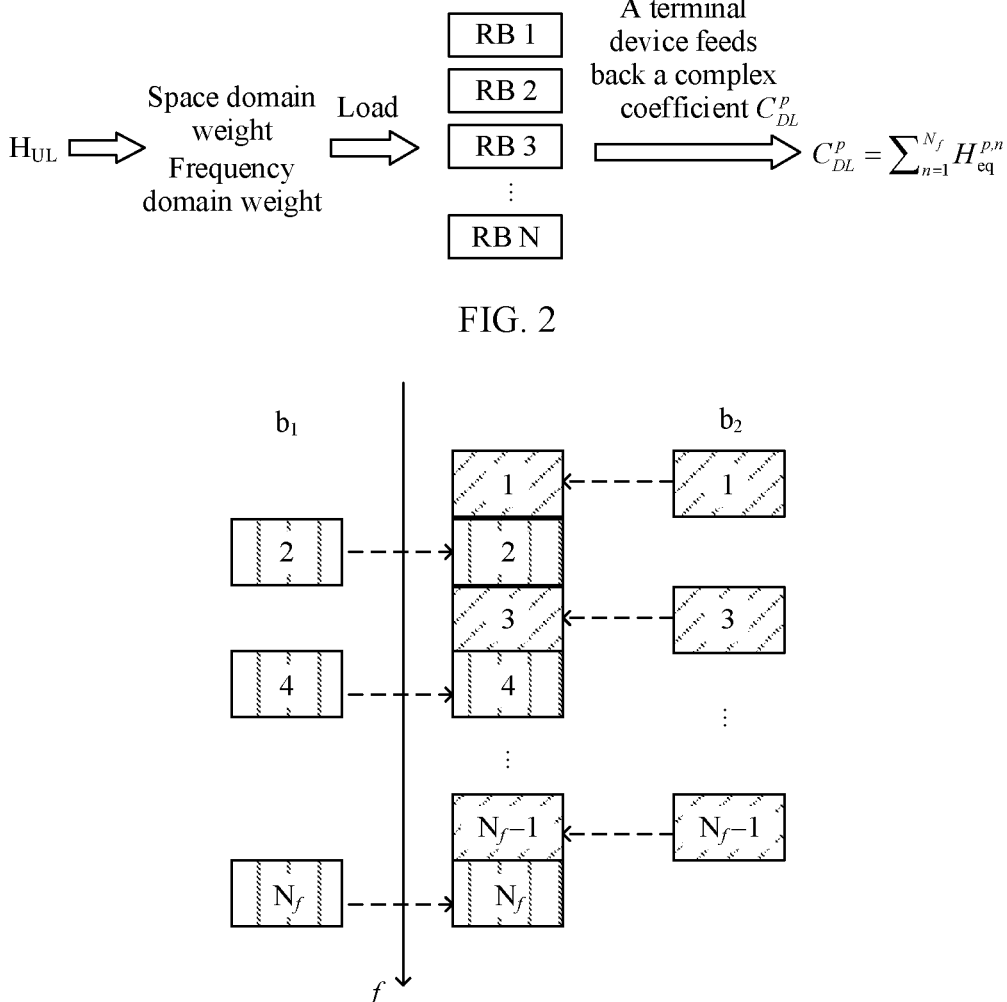
FIG. 2 is a schematic diagram of a channel state information obtaining solution.
FIG. 3 is a schematic diagram of resource block group division.

As shown in FIG. 2, a network device estimates angle information and delay information based on an uplink channel $H_{UL}$, and loads, onto a frequency domain unit of each port of a reference signal, a space domain weight and a frequency domain weight that are respectively corresponding to the angle information and the delay information. A terminal device obtains a corresponding complex coefficient based on the reference signal. For example, a complex coefficient $$C_{DL}^p$$

of one piece of angle and delay information loaded onto a $p^{th}$ port:

$$C_{DL}^p = \sum_{n=1}^{N_f} H_{eq}^{p,n} \qquad (3)$$

$$H_{eq}^{p,n}$$

represents an equivalent channel corresponding to the $p^{th}$ port and an $n^{th}$ frequency domain unit.

In this way, the network device may construct complete channel state information based on a space domain vector and a frequency domain vector that have reciprocity and with reference to a complex coefficient matrix $C_{DL}$ of a downlink channel. The complex coefficient matrix $C_{DL}$ may be determined based on a complex coefficient $$C_{DL}^p$$

of each port.

In addition, to reduce reference signal overheads, a plurality of pieces of angle-delay pair information may be loaded onto one port in a combing manner. In one manner, for one port, the network device may load a plurality of pieces of angle-delay pair information in a manner of performing resource grouping on a transmission bandwidth of the reference signal. For example, as shown in FIG. 3, it is assumed that 2 times combing is used. $N_f$ resource elements may be grouped into two groups in an index parity manner. As shown in FIG. 3, it is assumed that a first group includes indexes $2, 4, 6, \ldots, N_f$, and a second group includes indexes 1, 3, . . . , and $N_f$–1. As shown in FIG. 3, a weight b1 of a first piece of angle-delay pair information is loaded in the first group, and a weight b2 of a second piece of angle-delay pair information is loaded in the second group.

In addition, frequency domain resources may be grouped by using a plurality of reference signal pattern (RS pattern) configurations or a plurality of reference signal resource configurations. To be specific, O reference signal patterns correspond to O resource block groups, or O resource configurations correspond to the O resource block groups. For example, resource configuration of a CSI-RS includes two pattern configurations, which respectively correspond to a CSI-RS pattern 1 and a CSI-RS pattern 2. The CSI-RS ports are divided into two groups, and each CSI-RS pattern is corresponding to one group of CSI-RS ports. A CSI-RS port in the CSI-RS port group 1 is configured by using the CSI-RS pattern 1, and a CSI-RS port in the CSI-RS port group 2 is configured by using the CSI-RS pattern 2.

For another example, there are two CSI-RS resources, CSI-RS ports are divided into two groups, and each CSI-RS resource corresponds to one group of CSI-RS ports. A CSI-RS port in the CSI-RS port group 1 is configured by using a CSI-RS resource 1, and a CSI-RS port in the CSI-RS port group 2 is configured by using a CSI-RS resource 2.

In another manner of reducing reference signal overheads, a density of a reference signal is configured to be less than 1. For example, if the density is set to 0.25, it indicates that there is one reference signal for every four RBs. That is, the density of the reference signal ρ (ρ<1 and can be exactly divisible by 1) indicates that there is one reference signal in every 1/ρ RB.

It can be learned that the CSI obtaining solution 1 is characterized by high implementation complexity on the network device side and low implementation complexity on the terminal device side.

In a CSI obtaining solution 2, an angle and delay information loading manner 1.2 is as follows: Angle information is loaded onto a port of a reference signal, and a network device delivers, to a terminal device by using signaling, delay information obtained based on uplink channel measurement. In a CSI feedback mode 1.2, corresponding to the angle and delay information loading manner 1.2 or the angle and delay information loading manner 1.3, the terminal device may calculate a complex coefficient of each port based on the delivered delay information.

As shown in FIG. 4, a network device estimates angle information and delay information based on an uplink channel $H_{UL}$, loads a space domain weight corresponding to the angle information onto a frequency domain unit of each port of a reference signal, and delivers the delay information F to a terminal device. For example, a frequency domain weight corresponding to the delay information is indicated. The terminal device obtains a corresponding complex coefficient $$C_{DL}^{p,i}$$

based on the reference signal and the delay information F indicated by the network device.

For example, a complex coefficient $$C_{DL}^{p,i}$$

20 corresponding to an $i^{th}$ piece of delay information delivered by the network device and angle information loaded onto a port p:

$$C_{DL}^{p,i} = (f_i)^T H_{eq}^p \tag{4}$$

$$H_{eq}^p \in C^{N_f \times 1}$$

is an equivalent channel obtained by the terminal device on the port p. $f_i \in C^{N_f \times 1}$ is a frequency domain vector, and corresponds to the $i^{th}$ piece of delay information configured by the network device for the terminal device.

In this way, the network device may construct complete channel state information based on a space domain vector and a frequency domain vector that have reciprocity and with reference to a complex coefficient matrix $C_{DL}$ of a downlink channel. The complex coefficient matrix $C_{DL}$ may be determined based on a complex coefficient $$C_{DL}^{p,i}$$

of each port.

It can be learned that the CSI obtaining solution 2 is characterized by low reference signal overheads and low implementation complexity on the network device side, but high implementation complexity on the terminal device side. In addition, for improving system performance, the CSI obtaining solution 1 is better than the CSI obtaining solution 2.

In a CSI obtaining solution 3, an angle and delay information loading manner 1.3 is as follows: A part of angle-delay pair information is loaded on a port of a reference signal. For example, a network device groups obtained angle-delay pair information, and all pieces of angle-delay pair information in a same group correspond to same angle information. Then, the network device loads one piece of angle-delay pair information in each group onto the port of the reference signal, and delivers delay information in the remaining angle-delay pair information in each group to a terminal device. Correspondingly, a CSI feedback mode may use the manner described in the foregoing CSI feedback mode 1.2.

The CSI obtaining solution 3 is characterized by low reference signal overheads, and implementation complexity on the network device side is between the foregoing two CSI obtaining solutions. For system performance improvement, the CSI obtaining solution 3 is worse than the CSI obtaining solution 1, and is better than the CSI obtaining solution 2.

It can be learned that, for different CSI obtaining solutions, a communication system has different overheads, performance, and complexity. If a codebook corresponds to channel measurement configuration of only one CSI obtaining solution, the channel information obtaining method cannot meet requirements for overheads, performance, complexity, and the like.

This application provides a channel information obtaining method. In the method, a plurality of parameter configuration combinations are associated with a same codebook, which facilitates flexible configuration of channel information measurement, so that a corresponding CSI obtaining solution meets requirements for overheads, performance, complexity, and the like. The following is described with reference to the accompanying drawings.

FIG. 5 is a schematic flowchart of a channel information obtaining method according to an embodiment of this application. The channel information obtaining method is applicable to a first apparatus. Optionally, in FIG. 5, an example in which the first apparatus is a terminal device is used for description. For ease of description, the method shown in FIG. 5 is described from two ends of a network device and a terminal device. As shown in FIG. 5, the channel information obtaining method may include but is not limited to the following steps.

S101: The network device determines first indication information.

S102: The network device sends the first indication information.

The first indication information indicates one of a plurality of parameter configuration combinations of a reference signal, and the plurality of parameter configuration combinations are associated with a same codebook W. Optionally, the first indication information may indicate an index of a parameter configuration combination. This is not limited in this embodiment of this application.

S103: The terminal device receives the first indication information.

S104: The terminal device feeds back channel state information based on the parameter configuration combination indicated by the first indication information.

In this embodiment of this application, the plurality of parameter configuration combinations may correspond to a plurality of implementation behaviors on the network device side, for example, a plurality of angle and delay information loading manners of a port of the reference signal. Optionally, the plurality of parameter configuration combinations may correspond to a plurality of implementation behaviors on the terminal device side, for example, a plurality of channel state information CSI feedback modes. Therefore, the plurality of parameter configuration combinations are associated with the same codebook, so that these implementations can be implemented using the same codebook.

In an optional implementation, the parameter configuration combination indicated by the first indication information is associated with an angle and delay information loading manner. The angle and delay information loading manner is a manner in which the network device loads the angle and delay information onto the port of the reference signal when sending the reference signal. Based on this implementation, the network device may flexibly configure, based on overheads of different angle and delay information loading manners, requirements for improving system performance, complexity, and the like, a parameter configuration combination required for channel information measurement.

It can be learned that the network device may use the indicated parameter configuration combination, so that the network device may also use different angle and delay information loading manners in the same codebook, which facilitates flexible configuration of channel measurement information and meets requirements of a system for overheads, performance, complexity, and the like.

For example, the parameter configuration combination indicated by the first indication information includes a quantity K of frequency domain vectors corresponding to each port of the reference signal, where $K \geq 1$. When K is equal to 1, angle-delay pair information is loaded onto the port of the reference signal, for example, an angle and delay information loading manner 1.1. When K is greater than 1, angle information or a part of angle-delay pair information is loaded onto the port of the reference signal, for example, an angle and delay information loading manner 1.2 or an angle and delay information loading manner 1.3.

In other words, when K is equal to 1, the terminal device does not need to perform frequency domain search for the reference signal. In other words, all angle-delay pair information obtained through estimation is loaded onto the port of the reference signal sent on the network device side, that is, the angle and delay information loading manner 1.1 is used. When K is greater than 1, because all or a part of measured delay information is not loaded onto the reference signal by the network device, the terminal device needs to search for the reference signal in frequency domain, to obtain information about reciprocity of complex coefficients on each frequency domain component. In other words, the network device delivers a plurality of pieces of delay information to the terminal device in the angle and delay information loading manner 1.2 or the angle and delay information loading manner 1.3. That is, a quantity of frequency domain vectors corresponding to each port corresponds to an amount of delay information that needs to be measured for each port.

In the angle and delay information loading manner 1.2, the network device delivers all the delay information to the terminal device, but does not load the information onto the reference signal. In the angle and delay information loading manner 1.3, the network device delivers a part of the delay information to the terminal device, and loads a part of the angle-delay pair information onto the reference signal.

For another example, the parameter configuration combination indicated by the first indication information includes a quantity M of frequency domain vectors that are allowed to be selected by the first apparatus and that are in K frequency domain vectors corresponding to each port of the reference signal, where $K \geq 1$, and $1 \leq M \leq K$. When M is greater than 1, angle information or a part of angle-delay pair information is loaded onto the port of the reference signal.

In another optional implementation, the parameter configuration combination indicated by the first indication information is associated with a channel state information CSI feedback mode. The angle and delay information loading manner on the port of the reference signal is associated with the CSI feedback mode used by the terminal device. Therefore, this implementation helps the terminal device use the corresponding CSI feedback mode based on the indicated parameter configuration combination.

In still another optional implementation, the parameter configuration combination indicated by the first indication information is associated with an angle and delay information loading manner, and the parameter configuration combination indicated by the first indication information is further associated with a CSI feedback mode. In this way, for the network device side, the network device can flexibly select the angle and delay information loading manner. For the terminal device, a corresponding CSI feedback mode that needs to be used can be learned in a timely manner, to help meet requirements of a system for overheads, performance, complexity, and the like. For the related angle and delay information loading manner and the CSI feedback mode, refer to the foregoing description. Details are not described herein again.

The following further describes this embodiment of this application by using an optional codebook as an example.

In Embodiment 1, a plurality of parameter configuration combinations are associated with a same codebook W. The codebook W meets the following characteristic:

$$W = W_1 \tilde{W}_2 W_f^H \qquad (5)$$

$W_1$ is an angle and delay information selection matrix or a port selection matrix whose dimension is $OP \times L$, and indicates L pieces of angle and delay information or L ports selected by the terminal device from OP pieces of angle and delay information or OP ports, where $O \geq 1$, $P \geq 1$, and $1 \leq L \leq OP$. O represents an amount of angle-delay pair information or angle information loaded onto each port of the reference signal, or represents a quantity of resource configurations of the reference signal, or represents a quantity of pattern configurations of the reference signal. P represents a quantity of ports corresponding to one pattern configuration and one resource configuration of the reference signal, or represents a quantity of ports of the reference signal (for example, when one resource configuration and one pattern configuration are configured for the reference signal).

In addition, in $W_1$, for the selected L pieces of angle and delay information or L ports, L/2 same pieces of angle and delay information or ports may be selected in each polarization direction, or L/2 different pieces of angle and delay information or ports may be selected in each polarization direction. $\tilde{W}_2$ is a complex coefficient matrix whose dimension is $L \times M$, and $\tilde{W}_2$ includes a maximum of $K_0$ non-zero elements, where $1 \leq K_0 \leq L \times M$.

$W_f$ is a frequency domain selection matrix whose dimension is $N_f \times M$, and indicates M frequency domain vectors selected by the terminal device from the K frequency domain vectors corresponding to each port, where $1 \leq M \leq K \leq N_f$.

The parameter configuration combination indicated by the first indication information includes one or more of the following parameters of the codebook W: O, P, L, $N_f$, M, K, and $K_0$.

Optionally, a value of the foregoing parameter of the codebook W may be sent to the terminal device by using one or more pieces of indication information, for example, is separately indicated by using one or more pieces of signaling, or is hierarchically indicated by using a plurality of pieces of signaling. For example, P and L may be used as type 1 parameters, O may be used as a type 2 parameter, $N_f$, M, and K may be used as type 3 parameters, and $K_0$ may be used as a type 4 parameter. A single piece of signaling may simultaneously indicate one parameter of type 1 and one parameter of type 3. Alternatively, a single piece of signaling may simultaneously indicate one parameter of type 1, one parameter of type 2, and one parameter of type 3. Alternatively, a single piece of signaling may simultaneously indicate one parameter of type 1, one parameter of type 3, and one parameter of type 4. Alternatively, a single piece of signaling may simultaneously indicate one parameter of type 1, one parameter of type 2, one parameter of type 3, and one parameter of type 4.

It can be learned that in this embodiment of this application, when the network device loads angle-delay pair information onto the port of the reference signal, K may be set to be equal to 1. When the network device loads angle information or a part of angle-delay pair information onto the port of the reference signal, K may be set to be greater than 1. Regardless of any implementation used by the network device, the network device may construct the channel state information by using the same codebook shown in Formula (5). In this way, the network device may restrict K or M in $W_f$, so that various implementations can be performed by using the same codebook. Further, flexible configuration of channel information measurement is facilitated, to meet requirements of a system for performance, overheads, complexity, and the like.

For example, in a parameter configuration combination indicated by the first indication information, K and M are equal to 1. In the indicated parameter configuration combination or a parameter configuration combination indicated by another signaling, P=8, $N_f$=52, O=4, L=24, and $K_0$=24. Therefore, for the network device side, because K and M are equal to 1, the implementation described in the angle and delay information loading manner 1.1 may be used. For the terminal device side, because K and M are equal to 1, the implementation described in the CSI feedback mode 1.1 may be used. Further, the channel state information may be constructed based on the codebook shown in Formula (5).

For another example, in a parameter configuration combination indicated by the first indication information, K is equal to 4, or M=4. In the indicated parameter configuration combination or a parameter configuration combination indicated by another signaling, P=8, $N_f$=52, O=1, L=4, and $K_0$=24. For the network device side, because K is greater than 1 or M is greater than 1, the implementation described in the angle and delay information loading manner 1.2 or the angle and delay information loading manner 1.3 may be used. For the terminal device side, because K is greater than 1 or M is greater than 1, the implementation described in the CSI feedback mode 1.2 or the CSI feedback mode 1.3 may be used. Further, channel state information may be constructed based on the same codebook shown in Formula (5).

In an optional implementation, the network device may configure some parameters, so that the codebook $W_1$ shown in Formula (5) is simplified as an identity matrix. For example, when $O \times P$ is less than a first value, or when P is less than a second value, or when O is equal to 1, $W_1$ is an identity matrix. The first value and the second value may be notified to the terminal device by using a protocol agreement or a manner indicated by the network device.

In this embodiment of this application, the network device configures a value of K or M in $W_f$ in a same codebook, to use different implementations, so that the terminal device uses a CSI obtaining solution such as a different CSI feedback manner. Alternatively, the network device may configure K or M in $W_f$ to restrict configuration of another parameter.

In an optional implementation, when K is equal to 1, $O \geq 2$. Alternatively, when K is equal to 1, O=1, and a density of the reference signal is less than 1. When K is greater than 1 or M is greater than 1, O is equal to 1. In other words, when K is equal to 1, in addition to a corresponding implementation, the network device and the terminal device may further reduce reference signal overheads by loading a plurality of pieces of angle-delay pair information to the port of the reference signal, or configuring a plurality of resources or a plurality of patterns, or configuring the density of the reference signal to be less than 1.

For example, in a parameter configuration combination indicated by the first indication information, K is equal to 1, and M=1. In the indicated parameter configuration combination or a parameter configuration combination indicated by another signaling, P=8, $N_f$=52, O=4, L=24, and $K_0$=24. In this way, the network device may use the angle and delay information loading manner 1.1, and load four pieces of angle-delay pair information onto each port, or configure four resources or four patterns, to reduce reference signal overheads.

When K is equal to 1 and O is equal to 1, the density of the reference signal is less than 1. In other words, in addition to the foregoing corresponding implementations, the network device and the terminal device may further reduce reference signal overheads by reducing the density of the reference signal. For example, in a parameter configuration combination indicated by the first indication information, K is equal to 1, and M=1. In the indicated parameter configuration combination or a parameter configuration combination indicated by another signaling, when P=8, $N_f$=52, O=1, L=24, and $K_0$=16, the density of the reference signal may be set to 0.25, to reduce reference signal overheads.

When K is greater than 1 or M is greater than 1, O is equal to 1. That is, the network device and the terminal device may reduce required reference signal overheads by using corresponding implementations, for example, loading angle information or a part of angle-delay pair information. Therefore, O is equal to 1. For example, in a parameter configuration combination indicated by the first indication information, K is equal to 4, and M=4. In the indicated parameter configuration combination or a parameter configuration combination indicated by another signaling, P=8, $N_f$=52, O=1, L=4, and $K_0$=24. For another example, in a parameter configuration combination indicated by the first indication information, K is equal to 13, and M=4. In the indicated parameter configuration combination or a parameter configuration combination indicated by another signaling, P=8, $N_f$=13, O=1, L=8, and $K_0$=32.

It can be learned that in this embodiment of this application, reference signal overheads can be reduced by using a constraint relationship between parameters while performance and complexity requirements of each implementation are met.

In another optional implementation, when O is greater than 1, the angle-delay pair information is loaded onto the port of the reference signal, and both M and K are equal to 1. It can be learned that in this implementation, overheads are reduced in a manner of loading a plurality of pieces of angle-delay pair information to each port of the reference signal. Therefore, only one frequency domain vector needs to be configured in $W_f$, to avoid a problem of high complexity caused by the terminal device's need to search for a plurality of frequency domain vectors.

It can be learned that, in this implementation, a value of the parameter O in $W_1$ may be restricted, so that the network device may use different implementations for a same codebook to meet requirements of each implementation for performance and reference signal overheads, and reduce complexity on the terminal side by using a constraint relationship between parameters.

In one implementation, each port of the reference signal corresponds to K same frequency domain vectors in each resource configuration and each pattern configuration. In another implementation, each port of the reference signal may correspond to K different frequency domain vectors in each resource configuration and each pattern configuration, and K frequency domain vectors corresponding to different ports in each resource configuration and each pattern configuration need to be separately configured.

Different resource configurations of the reference signal may correspond to K different frequency domain vectors. Optionally, K frequency domain vectors corresponding to ports corresponding to a same resource configuration may be the same or different. Alternatively, different pattern configurations of the reference signal may correspond to K different frequency domain vectors. Optionally, K frequency domain vectors corresponding to ports corresponding to a same pattern configuration may be the same or different. Alternatively, different ports of the reference signal correspond to K different frequency domain vectors.

In this embodiment of this application, the parameter configuration combination indicated by the first indication information further includes a length K of a window, or further includes a start point of a window and a length K or a length 2K of the window. The window is an index range of optional frequency domain vectors that include the K frequency domain vectors corresponding to one part of the reference signal.

Optionally, indexes of the K frequency domain vectors may be consecutive. In this case, a start index of the K frequency domain vectors, for example, the start point of the window, may be a default value, or may be included in the parameter configuration combination indicated by the first indication information, or may be indicated by another piece of signaling.

Optionally, indexes of the K frequency domain vectors may be inconsecutive. In this case, the network device may indicate the K frequency domain vectors by using a window that includes the K frequency domain vectors.

Optionally, the network device may indicate the indexes of the K frequency domain vectors by using another piece of signaling.

In Embodiment 2, a plurality of parameter configuration combinations are associated with a same codebook W, and the codebook W meets the following characteristic:

$$W = W_1 \tilde{W}_2 W_f^H \qquad (6)$$

$W_1$ is a port selection matrix whose dimension is P×L, and indicates L ports selected by a first apparatus from P ports, where P≥1, and 1≤L≤P.

P represents a quantity of ports corresponding to one pattern configuration and one resource configuration of the reference signal, or represents a quantity of ports of the reference signal (for example, when a resource configuration and a pattern configuration are configured for the reference signal to perform channel measurement). In addition, in $W_1$, for the L ports, L/2 same ports may be selected in each polarization direction, or L/2 different ports may be selected in each polarization direction.

$\tilde{W}_2$ is a complex coefficient matrix whose dimension is L×M, and $\tilde{W}_2$ includes a maximum of $K_0$ non-zero elements, where 1≤$K_0$≤L×M.

$W_f$ is a frequency domain selection matrix whose dimension is $N_f$×M, and indicates M frequency domain vectors selected by the first apparatus from the K frequency domain vectors corresponding to each port, where 1≤M≤K≤$N_f$.

The parameter configuration combination indicated by the first indication information includes one or more of the following parameters of the codebook W:

P, L, $N_f$, M, K, and $K_0$.

Optionally, a value of the foregoing parameter of the codebook W may be sent to the terminal device by using one or more pieces of indication information, for example, is separately indicated by using one or more pieces of signaling, or is hierarchically indicated by using a plurality of pieces of signaling. For example, P and L may be used as type 1 parameters, $N_f$, M, and K may be used as type 2 parameters, and $K_0$ may be used as a type 3 parameter. A single piece of signaling may simultaneously indicate one parameter of type 1 and one parameter of type 2. Alternatively, a single piece of signaling may simultaneously indicate one parameter of type 1, and one parameter of type 3. Alternatively, a single piece of signaling may simultaneously indicate one parameter of type 1, one parameter of type 3, and one parameter of type 4.

It can be learned that in this embodiment of this application, when the network device loads angle-delay pair information onto the port of the reference signal, K may be set to be equal to 1. When the network device loads angle information or a part of angle-delay pair information onto the port of the reference signal, K may be set to be greater than 1. Regardless of any implementation used by the network device, the network device may construct the channel state information by using the same codebook shown in Formula (6). In this way, the network device may restrict K or M in $W_f$, so that various implementations can be performed by using the same codebook. Further, flexible configuration of channel information measurement is facilitated, to meet requirements of a system for performance, overheads, complexity, and the like.

For example, in a parameter configuration combination indicated by the first indication information, K and M are equal to 1. In the indicated parameter configuration combination or a parameter configuration combination indicated by another signaling, $P=32$, $N_f=52$, $L=24$, and $K_0=16$. Therefore, for the network device side, because K and M are equal to 1, the implementation described in the angle and delay information loading manner 1.1 may be used. For the terminal device side, because K and M are equal to 1, the implementation described in the CSI feedback mode 1.1 may be used. Further, the channel state information may be constructed based on the codebook shown in Formula (6). Optionally, P may be equal to 24.

For another example, in a parameter configuration combination indicated by the first indication information, K is equal to 4, or $M=4$. In the indicated parameter configuration combination or a parameter configuration combination indicated by another signaling, $P=8$, $N_f=52$, $L=4$, and $K_0=24$. For the network device side, because K is greater than 1 or M is greater than 1, the implementation described in the angle and delay information loading manner 1.2 or the angle and delay information loading manner 1.3 may be used. For the terminal device side, because K is greater than 1 or M is greater than 1, the implementation described in the CSI feedback mode 1.2 or the CSI feedback mode 1.3 may be used. Further, channel state information may be constructed based on the same codebook shown in Formula (6).

In an optional implementation, the network device may configure some parameters, so that the codebook $W_1$ shown in Formula (6) is simplified as an identity matrix. For example, $W_1$ is an identity matrix when P is less than a third value. The third value may be notified to the terminal device by using a protocol agreement or a manner indicated by the network device.

In this embodiment of this application, the network device configures a value of K or M in $W_f$ in a same codebook, to use different implementations, so that the terminal device uses a CSI obtaining solution such as a different CSI feedback manner. Alternatively, the network device may configure K or M in $W_f$ to restrict configuration of another parameter.

In an optional implementation, when K is equal to 1, the density of the reference signal is less than 1. In other words, when K is equal to 1, in addition to the foregoing corresponding implementations, the network device and the terminal device may further reduce reference signal overheads by reducing the density of the reference signal. For example, in a parameter configuration combination indicated by the first indication information, K is equal to 1, and $M=1$. In the parameter configuration combination indicated by the first indication information or a parameter configuration combination indicated by another signaling, $P=32$, $N_f=52$, $L=24$, and $K_0=16$. In this way, the network device may use the implementation described in the foregoing angle and delay information loading manner 1.1, and the terminal device may use the implementation described in the foregoing CSI feedback mode 1.1. Further, the network device may further configure the density of the reference signal to 0.25, to reduce reference signal overheads. For another example, in a parameter configuration combination indicated by the first indication information, K is equal to 1, and $M=1$. In the indicated parameter configuration combination or a parameter configuration combination indicated by another signaling, $P=24$, $N_f=52$, $L=24$, and $K_0=16$. In this example, the network device may use the implementation described in the foregoing angle and delay information loading manner 1.1, and the terminal device may use the implementation described in the foregoing CSI feedback mode 1.1. Further, the network device may alternatively set the density of the reference signal to 0.25, to reduce reference signal overheads.

It can be learned that this implementation can reduce reference signal overheads by using a constraint relationship between parameters while performance and complexity requirements of each implementation are met.

In addition, the P ports of the reference signal may correspond to K same frequency domain vectors, or the P ports of the reference signal may correspond to K different frequency domain vectors.

In this embodiment of this application, the parameter configuration combination indicated by the first indication information further includes a length K of a window, or further includes a start point of a window and a length K or a length 2K of the window. The window is an index range of optional frequency domain vectors that include the K frequency domain vectors corresponding to one part of the reference signal.

Optionally, indexes of the K frequency domain vectors may be consecutive. In this case, a start index of the K frequency domain vectors, for example, the start point of the window, may be a default value, or may be included in the parameter configuration combination indicated by the first indication information, or may be indicated by another piece of signaling.

Optionally, indexes of the K frequency domain vectors may be inconsecutive. In this case, the network device may indicate the K frequency domain vectors by using a window that includes the K frequency domain vectors.

Optionally, the network device may indicate the indexes of the K frequency domain vectors by using another piece of signaling.

In the foregoing embodiments provided in this application, the methods provided in the embodiments of this application are described separately from perspectives of the terminal device and the network device. To implement functions in the methods provided in embodiments of this application, the terminal device and the network device may include a hardware structure and a software module, and implement the foregoing functions in a form of the hardware structure, the software module, or a combination of the hardware structure and the software module. One of the foregoing functions may be performed by using the hardware structure, the software module, or the combination of the hardware structure and the software module. The following describes in detail communication apparatuses in embodiments of this application with reference to FIG. 6 to FIG. 8. The communication apparatus is a terminal device or a network device. Optionally, the communication apparatus may be an apparatus in a terminal device or a network device.

Figure 6:
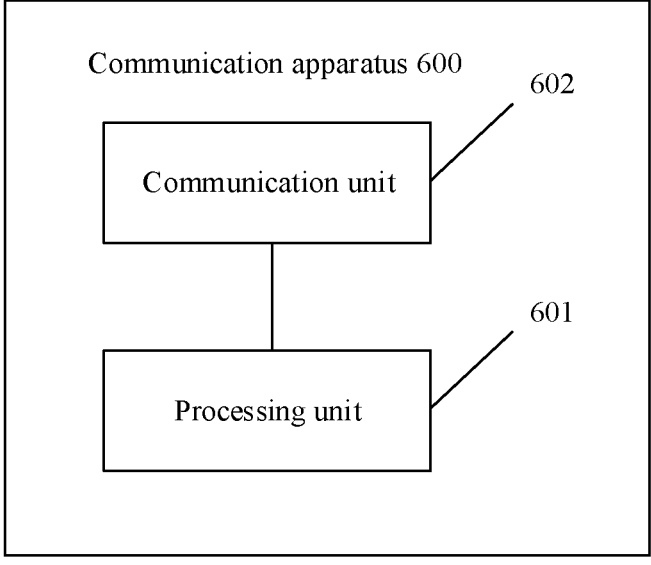
FIG. 6 is a schematic diagram of a structure of a communication apparatus 600 according to an embodiment of this application.

FIG. 6 is a schematic block diagram of a communication apparatus 600. The communication apparatus 600 may perform related operations of the network device in the foregoing method embodiments. The communication apparatus 600 includes but is not limited to:

a processing unit 601, configured to determine first indication information, where the first indication information indicates one of a plurality of parameter configuration combinations of a reference signal, and the plurality of parameter configuration combinations are associated with a same codebook W; and a communication unit 602, configured to send the first indication information.

Alternatively, the communication apparatus 600 may perform related operations of the terminal device in the foregoing method embodiments. The communication apparatus 900 includes but is not limited to:

a communication unit 602, configured to receive first indication information.

The communication unit 602 is further configured to feed back channel state information based on a parameter configuration combination indicated by the first indication information. The first indication information indicates one of a plurality of parameter configuration combinations of a reference signal, and the plurality of parameter configuration combinations are associated with a same codebook W.

Optionally, the communication apparatus 600 may further perform an optional implementation of the foregoing channel information obtaining method, and details are not described herein again.

Figure 7:
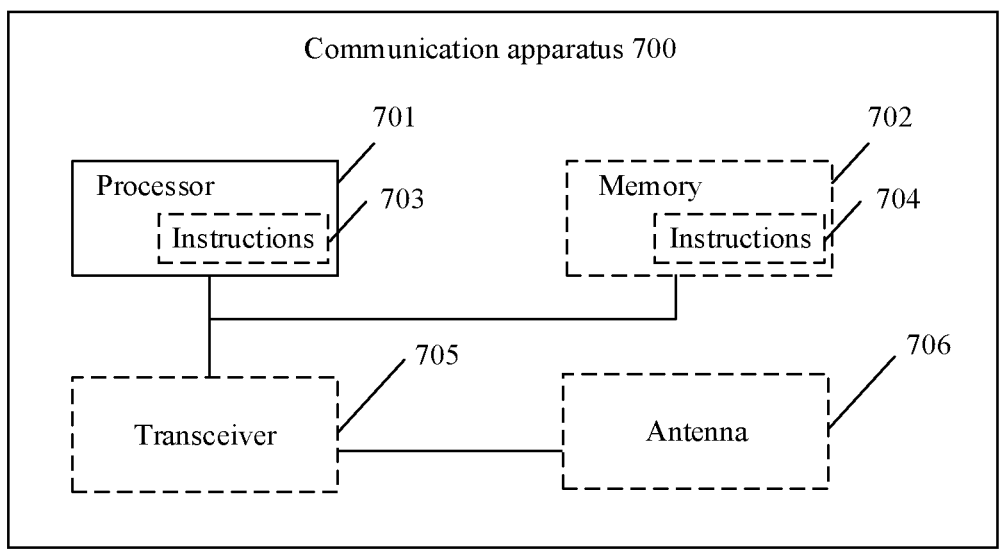
FIG. 7 is a schematic diagram of a structure of a communication apparatus 700 according to an embodiment of this application.

FIG. 7 is a schematic block diagram of a communication apparatus 700.

In an implementation, the communication apparatus 700 corresponds to the terminal device in the foregoing channel information obtaining method. Optionally, the communication apparatus 700 is an apparatus in the terminal device that performs the foregoing method embodiments, for example, a chip, a chip system, or a processor. The communication apparatus 700 may be configured to implement the methods described in the foregoing method embodiments. For details, refer to the description in the foregoing method embodiments.

In another implementation, the communication apparatus 700 corresponds to the network device in the foregoing channel information obtaining method. Optionally, the communication apparatus 700 is an apparatus in the network device that performs the foregoing method embodiments, for example, a chip, a chip system, or a processor. The communication apparatus 700 may be configured to implement the methods described in the foregoing method embodiments. For details, refer to the description in the foregoing method embodiments.

The communication apparatus 700 may include one or more processors 701. The processor 701 may be a general-purpose processor, a dedicated processor, or the like. For example, the processor 701 may be a baseband processor or a central processing unit. The baseband processor may be configured to process a communication protocol and communication data, and the central processing unit may be configured to control a communication apparatus (for example, a base station, a baseband chip, a terminal, a terminal chip, a DU, or a CU), execute a computer program, and process data of the computer program.

The communication apparatus 700 may further include a transceiver 705. The transceiver 705 may be referred to as a transceiver unit, a transceiver, a transceiver circuit, or the like, and is configured to implement a transceiver function. The transceiver 705 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communication apparatus 700 may further include an antenna 706.

Optionally, the communication apparatus 700 may include one or more memories 702. The memory 702 may store instructions 704. The instructions 704 may be a computer program. The computer program may be run on the communication apparatus 700, so that the communication apparatus 1000 is enabled to perform the method described in the foregoing method embodiments. Optionally, the memory 702 may further store data. The communication apparatus 700 and the memory 702 may be separately disposed, or may be integrated together.

In an implementation, when the communication apparatus 700 is configured to implement a function of the network device in the foregoing method embodiments, the processor 701 is configured to perform step S101 in FIG. 5; and the transceiver 705 is configured to perform step S102 in FIG. 5.

In another implementation, when the communication apparatus 700 is configured to implement a function of the terminal device in the foregoing method embodiments, the transceiver 705 is configured to perform steps S103 and S104 in FIG. 5.

In an implementation, the processor 701 may include a transceiver configured to implement a receiving function and a sending function. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In an implementation, the processor 701 may store instructions 703. The instructions may be a computer program. The computer program 703 is run on the processor 701, so that the communication apparatus 700 is enabled to perform the methods described in the foregoing method embodiments. The computer program 703 may be fixed in the processor 701. In this case, the processor 701 may be implemented by hardware.

In an implementation, the communication apparatus 700 may include a circuit, and the circuit may implement a sending, receiving, or communication function in the foregoing method embodiments. The processor and the transceiver described in this application may be implemented on an integrated circuit (integrated circuit, IC), an analog IC, a radio frequency integrated circuit (radio frequency integrated circuit, RFIC), a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-type metal oxide semiconductor (N-type metal oxide semiconductor, NMOS), a P-type metal oxide semiconductor (P-type metal oxide semiconductor, PMOS), a bipolar junction transistor (bipolar junction transistor, BJT), a bipolar CMOS (BiCMOS), silicon germanium (SiGe), and gallium arsenide (GaAs).

The communication apparatus described in the foregoing embodiment may be an AP MLD or an AP of the AP MLD. However, a scope of the communication apparatus described in this application is not limited thereto, and a structure of the communication apparatus may not be limited by FIG. 7. The communication apparatus may be an independent device or may be a part of a large device. For example, the communication apparatus may be:

(1) an independent integrated circuit IC, a chip, or a chip system or subsystem;

(2) a set including one or more ICs, where optionally, the set of ICs may further include a storage component configured to store data and a computer program;

(3) an ASIC such as a modem (Modem);

(4) a module that can be embedded in another device;

(5) a receiver, a terminal device, an intelligent terminal, a cellular phone, a wireless device, a handheld device, a mobile unit, a vehicle-mounted device, a network device, a cloud device, an artificial intelligence device, or the like; or (6) others.

Figure 8:
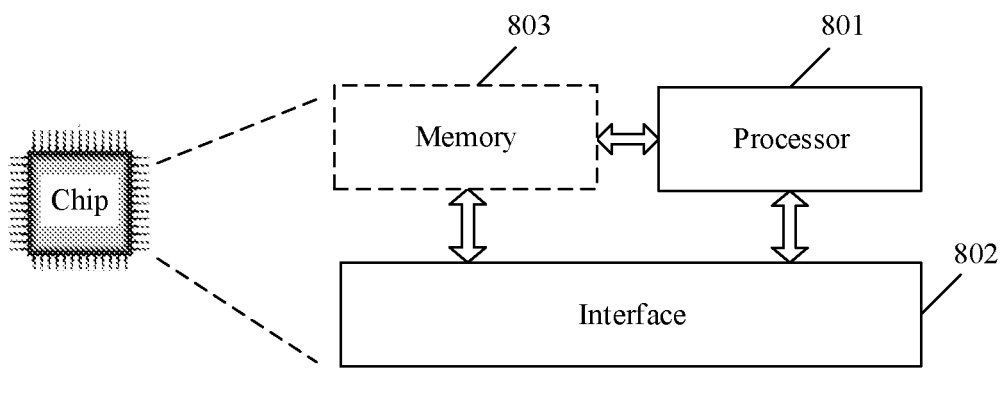
FIG. 8 is a schematic diagram of a structure of a chip according to an embodiment of this application.

For a case in which the communication apparatus may be a chip or a chip system, refer to a schematic diagram of a structure of a chip shown in FIG. 8. The chip shown in FIG. 8 includes a processor 801 and an interface 802. There may be one or more processors 801, and there may be a plurality of interfaces 802.

When the chip is configured to implement a function of the network device in the foregoing method embodiments, the processor 801 is configured to perform step S101 in FIG. 5; and the interface 802 is configured to perform step S102 in FIG. 5.

Optionally, the chip may further perform a function of the terminal device in the foregoing method embodiments, the interface 802 is configured to perform steps S103 and S104 in FIG. 5.

Optionally, the chip may further perform a related implementation in the foregoing method embodiments, and details are not described herein again.

A person skilled in the art may further understand that various illustrative logical blocks (illustrative logic block) and steps (step) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the protection scope of embodiments of this application.

This application further provides a computer-readable storage medium storing a computer program. When the computer-readable storage medium is executed by a computer, the function in any one of the foregoing method embodiments is implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer programs. When the computer program is loaded and executed on a computer, the procedures or functions according to embodiments of this application are all or partially generated. The computer may be a general-purpose computer, a dedicated computer, a computer network, or another programmable apparatus. The computer program may be stored in a computer-readable storage medium or may be transmitted from a computer-readable storage medium to another computer-readable storage medium. For example, the computer program may be transmitted from a web site, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, a hash list, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, applied to a first apparatus, wherein the method comprises:

receiving first indication information, wherein the first indication information indicates one of a plurality of parameter configuration combinations of a reference signal, and the plurality of parameter configuration combinations are associated with a same codebook W; and feeding back channel state information based on the indicated parameter configuration combination, wherein the codebook W meets the following characteristic:

$W = W_1 \tilde{W}_2 W_f^H$, wherein $W_1$ is an angle and delay information selection matrix or a port selection matrix whose dimension is OP×L, and indicates L pieces of angle and delay information or L ports selected by the first apparatus from OP pieces of angle and delay information or OP ports, wherein O≥1, P≥1, and 1≤L≤OP;

O represents an amount of angle-delay pair information or angle information loaded onto each port of the reference signal, or represents a quantity of resource configurations of the reference signal, or represents a quantity of pattern configurations of the reference signal, and P represents a quantity of ports corresponding to one pattern configuration and one resource configuration of the reference signal;

$\tilde{W}_2$ is a complex coefficient matrix whose dimension is L×M, and $\tilde{W}_2$ comprises a maximum of $K_0$ non-zero elements, wherein 1≤$K_0$≤L×M; and $W_f$ is a frequency domain selection matrix whose dimension is $N_f$×M, and indicates M frequency domain vectors selected by the first apparatus from K frequency domain vectors corresponding to each port, and $N_f$ represents a quantity of frequency domain units comprised in a transmission bandwidth of the reference signal, wherein 1≤M≤K≤$N_f$; and the parameter configuration combination indicated by the first indication information comprises O and P and one or more of the following parameters of the codebook W:

L, $N_f$, M, K, or $K_0$.

34

2. The method according to claim 1, wherein
the indicated parameter configuration combination is associated with an angle and delay information loading manner; or
the indicated parameter configuration combination is associated with a channel state information (CSI) feedback mode.

3. The method according to claim 1, wherein
the parameter configuration combination indicated by the first indication information comprises K, wherein K≥1; and
when K is equal to 1, angle-delay pair information is loaded onto the port of the reference signal; or
when K is greater than 1, angle information or a part of angle-delay pair information is loaded onto the port of the reference signal.

4. The method according to claim 1, wherein
the parameter configuration combination indicated by the first indication information comprises M, wherein K≥1, and 1≤M≤K; and
when M is greater than 1, angle information or a part of angle-delay pair information is loaded onto the port of the reference signal.

5. The method according to claim 1, wherein
each port of the reference signal corresponds to K same frequency domain vectors in each resource configuration and each pattern configuration.

6. The method according to claim 5, wherein
the parameter configuration combination indicated by the first indication information further comprises a length K of a window; and
the window is an index range of optional frequency domain vectors that comprise the K frequency domain vectors corresponding to each port of the reference signal.

7. The method according to claim 6, wherein
indexes of the K frequency domain vectors are consecutive, a start index of the K frequency domain vectors represents a start point of the window, and the start index is a default value.

8. A communication apparatus, wherein the communication apparatus comprises: at least one processor, and one or more memories coupled to the at least one processor and storing programming instructions for execution by the at least one processor to perform operations comprising:

receiving first indication information, wherein the first indication information indicates one of a plurality of parameter configuration combinations of a reference signal, the plurality of parameter configuration combinations are associated with a same codebook W; and feeding back channel state information based on the indicated parameter configuration combination, wherein the codebook W meets the following characteristic:

$W = W_1 \tilde{W}_2 W_f^H$, wherein $W_1$ is an angle and delay information selection matrix or a port selection matrix whose dimension is OP×L, and indicates L pieces of angle and delay information or L ports selected from OP pieces of angle and delay information or OP ports, wherein O≥1, P≥1, and 1≤L≤OP;

O represents an amount of angle-delay pair information or angle information loaded onto each port of the reference signal, or represents a quantity of resource configurations of the reference signal, or represents a quantity of pattern configurations of the reference signal, and P represents a quantity of ports corresponding to one pattern configuration and one resource configuration of the reference signal;

$\tilde{W}_2$ is a complex coefficient matrix whose dimension is L×M, and $\tilde{W}_2$ comprises a maximum of $K_0$ non-zero elements, wherein $1 \leq K_0$ L×M; and $W_f$ is a frequency domain selection matrix whose dimension is $N_f$×M, and indicates M frequency domain vectors selected from K frequency domain vectors corresponding to each port, and $N_f$ represents a quantity of frequency domain units comprised in a transmission bandwidth of the reference signal, wherein $1 \leq M \leq K \leq N_f$, and the parameter configuration combination indicated by the first indication information comprises O and P and one or more of the following parameters of the codebook W;

L, Nr, M, K, or $K_0$.

9. The apparatus according to claim 8, wherein the indicated parameter configuration combination is associated with an angle and delay information loading manner; or the indicated parameter configuration combination is associated with a channel state information (CSI) feedback mode.

10. The apparatus according to claim 8, wherein the parameter configuration combination indicated by the first indication information comprises K, wherein K≥1; and when K is equal to 1, angle-delay pair information is loaded onto the port of the reference signal; or when K is greater than 1, angle information or a part of angle-delay pair information is loaded onto the port of the reference signal.

11. The apparatus according to claim 8, wherein the parameter configuration combination indicated by the first indication information comprises M, wherein K≥1, and 1≤M≤K; and when M is greater than 1, angle information or a part of angle-delay pair information is loaded onto the port of the reference signal.

12. The apparatus according to claim 8, wherein each port of the reference signal corresponds to K same frequency domain vectors in each resource configuration and each pattern configuration.

13. The apparatus according to claim 12, wherein the parameter configuration combination indicated by the first indication information further comprises a length K of a window; and the window is an index range of optional frequency domain vectors that comprise the K frequency domain vectors corresponding to each port of the reference signal.

14. The apparatus according to claim 13, wherein indexes of the K frequency domain vectors are consecutive, a start index of the K frequency domain vectors represents a start point of the window, and the start index is a default value.

15. A non-transitory computer-readable storage medium, comprising instructions for being executed by at least one processor to cause an apparatus to perform operations comprising:

receiving first indication information, wherein the first indication information indicates one of a plurality of parameter configuration combinations of a reference signal, the plurality of parameter configuration combinations are associated with a same codebook W; and feeding back channel state information based on the indicated parameter configuration combination, wherein the codebook W meets the following characteristic:

$$W = W_1 \tilde{W}_2 W_f^H, \text{ wherein}$$

$W_1$ is an angle and delay information selection matrix or a port selection matrix whose dimension is OP×L, and indicates L pieces of angle and delay information or L ports selected from OP pieces of angle and delay information or OP ports, wherein O≥1, P≥1, and 1≤L≤OP;

O represents an amount of angle-delay pair information or angle information loaded onto each port of the reference signal, or represents a quantity of resource configurations of the reference signal, or represents a quantity of pattern configurations of the reference signal, and P represents a quantity of ports corresponding to one pattern configuration and one resource configuration of the reference signal;

$\tilde{W}_2$ is a complex coefficient matrix whose dimension is L×M, and $\tilde{W}_2$ comprises a maximum of $K_0$ non-zero elements, wherein $1 \leq K_0 \leq L \times M$; and $W_f$ is a frequency domain selection matrix whose dimension is $N_f$× M, and indicates M frequency domain vectors selected from K frequency domain vectors corresponding to each port, and $N_f$ represents a quantity of frequency domain units comprised in a transmission bandwidth of the reference signal, wherein $1 \leq M \leq K \leq N_f$; and the parameter configuration combination indicated by the first indication information comprises O and P and one or more of the following parameters of the codebook W;

L, $N_f$, M, K, or $K_0$.

16. The non-transitory computer-readable storage medium according to claim 15, wherein the indicated parameter configuration combination is associated with an angle and delay information loading manner; or the indicated parameter configuration combination is associated with a channel state information (CSI) feedback mode.

17. The non-transitory computer-readable storage medium according to claim 15, wherein the parameter configuration combination indicated by the first indication information comprises K, wherein K≥1; and when K is equal to 1, angle-delay pair information is loaded onto the port of the reference signal; or when K is greater than 1, angle information or a part of angle-delay pair information is loaded onto the port of the reference signal.

18. The non-transitory computer-readable storage medium according to claim 15, wherein the parameter configuration combination indicated by the first indication information comprises M, wherein K≥1, and 1≤M≤K; and when M is greater than 1, angle information or a part of angle-delay pair information is loaded onto the port of the reference signal.

19. The non-transitory computer-readable storage medium according to claim 15, wherein each port of the reference signal corresponds to K same frequency domain vectors in each resource configuration and each pattern configuration.

20. The non-transitory computer-readable storage medium according to claim 19, wherein the parameter configuration combination indicated by the first indication information further comprises a length K of a window; and the window is an index range of optional frequency domain vectors that comprise the K frequency domain vectors corresponding to each port of the reference signal.

21. The non-transitory computer-readable storage medium according to claim 20, wherein indexes of the K frequency domain vectors are consecutive, a start index of the K frequency domain vectors represents a start point of the window, and the start index is a default value.

\*   \*   \*   \*   \*